(12) United States Patent
Zhang et al.

(10) Patent No.: US 11,089,572 B2
(45) Date of Patent: Aug. 10, 2021

(54) METHOD FOR TRANSMITTING MULTICAST SERVICE, METHOD FOR RECEIVING MULTICAST SERVICE, AND APPARATUS

(71) Applicant: CHINA ACADEMY OF TELECOMMUNICATIONS TECHNOLOGY, Beijing (CN)

(72) Inventors: Yuan Zhang, Beijing (CN); Jing Liang, Beijing (CN); Jing Fu, Beijing (CN); Yan Wang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/322,553

(22) PCT Filed: Jul. 24, 2017

(86) PCT No.: PCT/CN2017/094142
§ 371 (c)(1),
(2) Date: Feb. 1, 2019

(87) PCT Pub. No.: WO2018/028422
PCT Pub. Date: Feb. 15, 2018

(65) Prior Publication Data
US 2019/0174460 A1 Jun. 6, 2019

(30) Foreign Application Priority Data
Aug. 12, 2016 (CN) .......................... 2016 1 0665328

(51) Int. Cl.
*H04W 72/00* (2009.01)
*H04L 5/00* (2006.01)
(Continued)

(52) U.S. Cl.
CPC ........... *H04W 72/005* (2013.01); *H04L 5/001* (2013.01); *H04L 27/2666* (2013.01); *H04W 4/06* (2013.01);
(Continued)

(58) Field of Classification Search
CPC ..... H04W 72/005; H04W 72/12; H04W 4/06; H04W 4/20; H04W 72/0453;
(Continued)

(56) References Cited

U.S. PATENT DOCUMENTS

2009/0274120 A1  11/2009  Chou
2010/0130219 A1  5/2010  Cave et al.
(Continued)

FOREIGN PATENT DOCUMENTS

CN  101772087      7/2010
CN  101873636 A   10/2010
(Continued)

OTHER PUBLICATIONS

Taiwanese Office Action dated Aug. 9, 2018 for TW Application No. 106125683.
(Continued)

*Primary Examiner* — Walli Z Butt
(74) *Attorney, Agent, or Firm* — Harness, Dickey and Pierce, P.L.C.

(57) ABSTRACT

A method and an apparatus for transmitting a multicast service and a method and an apparatus for receiving a multicast service are provided. The method for receiving a multicast service includes receiving information about the multicast service transmitted by a network side on carriers, the carriers being an anchor carrier and/or non-anchor carriers; selecting a target carrier from the carriers according to the information about the multicast service, wherein the target carrier is the anchor carrier or the non-anchor carrier.

18 Claims, 3 Drawing Sheets

(51) Int. Cl.
*H04L 27/26* (2006.01)
*H04W 4/20* (2018.01)
*H04W 72/12* (2009.01)
*H04W 4/06* (2009.01)
*H04W 72/04* (2009.01)

(52) U.S. Cl.
CPC ............. *H04W 4/20* (2013.01); *H04W 72/12* (2013.01); *H04W 72/0453* (2013.01); *Y02D 30/70* (2020.08)

(58) Field of Classification Search
CPC ......... H04W 28/0205; H04W 52/0212; H04W 72/1263; H04W 72/1278; H04W 74/0833; H04L 5/001; H04L 27/2666; Y02D 70/00
See application file for complete search history.

(56) References Cited

U.S. PATENT DOCUMENTS

| | | | |
|---|---|---|---|
| 2010/0232382 | A1 | 9/2010 | Gauvreau et al. |
| 2011/0211519 | A1 | 9/2011 | Katayama et al. |
| 2012/0213130 | A1* | 8/2012 | Zhang .................. H04L 5/143 370/280 |
| 2013/0010964 | A1* | 1/2013 | Fong .................. H04L 5/0092 380/277 |
| 2015/0288566 | A1 | 10/2015 | Sadek |
| 2015/0381378 | A1 | 12/2015 | Zhang et al. |
| 2016/0261394 | A1* | 9/2016 | Kazmi ................. H04L 5/0058 |
| 2017/0215191 | A1 | 7/2017 | Martin |
| 2017/0303157 | A1* | 10/2017 | Siomina ................. H04W 4/06 |

FOREIGN PATENT DOCUMENTS

| | | |
|---|---|---|
| CN | 102056086 | 5/2011 |
| CN | 102487480 A | 6/2012 |
| JP | 2011-181993 A | 9/2011 |
| JP | 2016007010 A | 1/2016 |
| JP | 2016518056 A | 6/2016 |
| KR | 10-2013-0132614 A | 12/2013 |
| KR | 1020150138854 | 12/2015 |
| TW | 201042963 | 12/2010 |
| TW | I466568 | 12/2014 |
| TW | I488524 | 6/2015 |
| TW | 201542012 | 11/2015 |
| TW | 201616913 | 5/2016 |
| WO | WO-2013049301 A2 | 4/2013 |
| WO | WO-2014/133652 A1 | 9/2014 |

OTHER PUBLICATIONS

Chinese Office Action dated Dec. 28, 2018 for CN Application No. 201610665328.4.
International Search Report PCT/ISA/210 for International Application No. PCT/CN2017/094142 dated Oct. 17, 2017.
Extended European Search Report dated Jul. 24, 2019 for EP Application No. 17838552.2.
LG Electronics Inc., "Potential enhancement for MBMS Control Plane latency reduction," 3GPP TSG-RAN WG2 #94, R2-164073, May 22, 2016, Nanjing, China.
LG Electronics Inc., DL broadcast enhancement for V2X, 3GPP TSG-RAN WG2 #93bis, R2-162943, Agenda Item 8.11.2, Apr. 2, 2016, Dubrovnik, Croatia.
Japanese Office Action dated Jan. 12, 2019 for JP Application No. 2019-506664.
Korean Office Action dated Feb. 7, 2020 for KR Application No. 10-2019-7007217.
Ericsson, "UE Reconfiguration to a Non-Anchor Carrier in NB-Iot", 3GPP TSG-RAN WG2 #93bix, Tdoc R2-162769, Dubronvik, Croatia, Apr. 11-15, 2016.
European Office Action dated Dec. 22, 2020 for Application No. 17 838 552.2.

* cited by examiner transmitting information about a multicast service by a network side on carriers, wherein the carriers are an anchor carrier and/or non-anchor carriers — 21

Fig. 2

Receiving the information about the multicast service transmitted by the network side on the carriers, wherein the carriers are the anchor carrier and/or the non-anchor carriers — 31

Selecting a target carrier from the carriers according to the information about the multicast service, and receiving the multicast service on the selected target carrier, wherein the target carrier is the anchor carrier and/or the non-anchor carrier — 32

Fig. 3

Transmission module — 101

Fig. 4

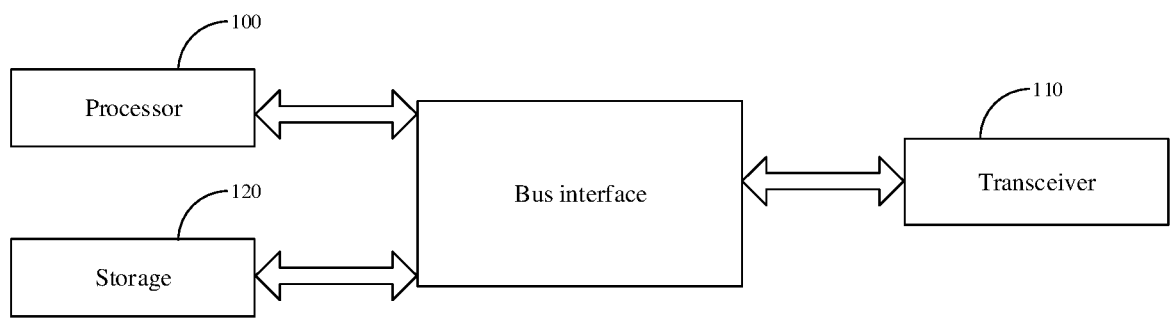

Fig. 5

METHOD FOR TRANSMITTING MULTICAST SERVICE, METHOD FOR RECEIVING MULTICAST SERVICE, AND APPARATUS

CROSS-REFERENCE TO RELATED APPLICATIONS

This application is a national phase under 35 U.S.C. § 371 of PCT International Application No. PCT/CN2017/094142 which has an International filing date of Jul. 24, 2017, which claims priority to Chinese patent application No. 201610665328.4, filed Aug. 12, 2016, the entire contents of each of which are hereby incorporated by reference.

TECHNICAL FIELD

The present disclosure relates to a field of communication technology, and in particular, relates to a method for transmitting a multicast service, a method for receiving a multicast service, an apparatus for transmitting a multicast service, and an apparatus for receiving a multicast service.

BACKGROUND

A Work Item (WI) for a Narrow Band Internet of Things (NB-IoT) is agreed and initiated in a Release 13 of 3rd Generation Partner Project (3GPP). An objective of the WI for the NB-IoT is to standardize a wireless access technology for a Cellular Internet of Things (CIoT). The technology is an expansion based on a Long Term Evolution (LTE) or LTE-Advanced (LTE-A), and a main network characteristic or a target of the technology to be designed is to enhance indoor coverage, support a large quantity of low-speed devices to access a network, provide a low-latency sensitivity, reduce a device cost, reduce device consumption, optimize a network architecture, and the like.

Some characteristics that have been recognized and possibly exist in the NB-IoT may include: a NB-IoT terminal has a low mobility; the NB-IoT terminal has a low transmission real-time requirement for data transmissions between the NB-IoT terminal and a network side; an energy of the NB-IoT terminal is limited and has an extremely-low power consumption; a small quantity of data is transmitted between the NB-IoT terminal and the network side; and the NB-IoT terminal has a low complexity, and the like. An actual NB-IoT terminal may has one or more of the above characteristics.

To reduce a load on a cell, the NB-IoT supports a multi-carrier operation. In the multi-carrier operation, carriers are divided into an anchor carrier and non-anchor carriers. On the anchor carrier, the terminal may receive a Narrowband Physical Broadcast Channel (NPBCH) transmission/a Narrowband Primary Synchronization Signal (NPSS) transmission, a Narrowband Secondary Synchronization Signal (NBSS) transmission and a System Information Block (SIB) transmission; and on the non-anchor carriers, the terminal based on the R13 only anticipates a Narrowband Physical Downlink Control Channel (NB-PDCCH)/a Narrowband Physical Downlink Share Channel (NB-PDSCH) and/or a Narrowband Physical Uplink Share Channel (NB-PUSCH).

Since the NB-IoT terminal has a limited capability, the NB-IoT terminal may not operate in a plurality of carriers simultaneously. In the R13, a random access procedure may only be initiated on the anchor carrier. When a User Equipment (UE) in a connected state is configured with the non-anchor carriers, the UE may continue to operate on the non-anchor carriers subsequently, until the UE enters an idle state or the random access procedure needs to be initiated in the connected state or the UE is allocated another carrier.

The R13 only supports the UE in the idle state to camp on the anchor carrier, and a subsequent enhanced version of the R13 may allow the UE to receive a paging message on the non-anchor carriers or even camp on the non-anchor carriers.

In an Evolved Universal Mobile Telecommunications System Terrestrial Radio Access Network (E-UTRAN (a 3G access network)), the UE may receive a Multimedia Broadcast Multicast Service (MBMS) when the UE is in a Radio Resource Control (RRC)_connected state or a RRC_idle state, and a cell has to support both a unicast service and the MBMS. When the UE receives the MBMS, the UE may also receive the paging message or initiate a call. A logical architecture of a MBMS system is shown in FIG. 1.

In the LTE, a multicast service may be transmitted through the MBMS and a Single Cell Point to Multi-point (SC-PTM) manner.

When the multicast service is transmitted through the MBMS, all cells participating the MBMS in a certain Multimedia Broadcast Multicast Service Single Frequency Network (MBSFN) transmit same contents in same time and frequency resources. Logical channels in the MBMS include a Multicast Control Channel (MCCH) and a Multicast Traffic Channel (MTCH). A region identifier of the MBSFN and MCCH configuration information corresponding to the region identifier are broadcast in SIB13. A MCCH signaling carries information about MBMS services currently existing in a current cell and radio resource configurations corresponding to the MBMS services. A User Equipment (UE) may receive the MCCH, and further receive a MBMS service interested by the UE and transmitted in the MTCH. Updating a MCCH message is similar to that in a system message modification period, and only at a boundary of a MCCH modification period, the MCCH may be updated. An indication for updating the MCCH message may be transmitted through a PDCCH scrambled by a M-RNTI (Radio Network Temporary Identifier).

When the multicast service is transmitted through the SC-PTM, the multicast service is transmitted in a single cell, and a base station is responsible for scheduling. The base station may schedule transmissions of a multicast service and a unicast service flexibly in the cell. Logical channels in the SC-PTM include a Single Cell Multicast Control Channel (SC-MCCH) and a Single Cell Multicast Transport Channel (SC-MTCH). The SC-MCCH and the SC-MTCH are transmitted in a DL-SCH, and the UE obtains specific scheduling information in the DL-SCH through a PDCCH scrambled by a specific RNTI (a RNTI corresponding to the SC-MCCH is SC-RNTI which is a fixed value; and a RNTI corresponding to the SC-MTCH is G-RNTI, wherein MBMS services correspond to G-RNTIs in a one-to-one manner, and the G-RNTIs are configured in the SC-MCCH). Configuration information for the SC-MCCH is broadcast in SIB 20. The SC-MCCH provides information about the MBMS service currently existing in a cell, and provides scheduling information corresponding to the MBMS service, and information about the SC-PTM provided by a neighboring cell. Similar to the MCCH, updating the SC-MCCH also employs a concept of the modification period. The indication for updating the SC-MCCH is transmitted through a PDCCH scrambled by a SC-N-RNTI. After the UE receives the indication for updating the SC-MCCH, the UE receives an updated SC-MCCH in a same subframe.

The multi-carrier operation is supported in the NB-IoT. However, in a same time point, the NB-IoT terminal may only operate in a carrier. If information about the multicast service may be transmitted on the non-anchor carriers, then there is no relevant research performed on how the UE may receive the multicast service when the terminal currently operates on the non-anchor carriers or camps on the non-anchor carriers.

SUMMARY

An objective of the present disclosure is to provide a method for transmitting a multicast service, a method for receiving a multicast service, an apparatus for transmitting a multicast service and an apparatus for receiving a multicast service, so as to address a problem that a terminal may not receive a multicast service on the non-anchor carriers.

To achieve the above objective, a method for transmitting a multicast service is provided in the present disclosure. The method is applied to a network side and includes: transmitting information about the multicast service by a network side on carriers, wherein the carriers are an anchor carrier and/or non-anchor carriers.

Optionally, transmitting the information about the multicast service by the network side on the carriers, includes: transmitting by the network side, on the non-anchor carriers, a multicast service channel of the non-anchor carriers, a multicast control channel of the non-anchor carriers, and a multicast control channel updating indication of the non-anchor carriers; transmitting by the network side, on the anchor carrier, a multicast service channel of the anchor carrier, a multicast control channel of the anchor carrier, a multicast control channel updating indication of the anchor carrier, first information for receiving the multicast control channel of the anchor carrier, second information for receiving the multicast control channel of the non-anchor carriers, third information for receiving the multicast control channel updating indication of the anchor carrier, and fourth information for receiving the multicast control channel updating indication of the non-anchor carriers.

Optionally, transmitting the information about the multicast service by the network side on the carriers, includes: transmitting, by the network side on the non-anchor carriers, a multicast service channel of the non-anchor carriers and a multicast control channel updating indication of the non-anchor carriers; transmitting, by the network side transmits on the anchor carrier, a multicast service channel of the anchor carrier, a multicast control channel of the anchor carrier, a multicast control channel updating indication of the anchor carrier, first information for receiving the multicast control channel of the anchor carrier, third information for receiving the multicast control channel updating indication of the anchor carrier, and fourth information for receiving the multicast control channel updating indication of the non-anchor carriers.

Optionally, transmitting the information about the multicast service by the network side on the carriers, includes: transmitting, by the network side on the non-anchor carriers, a multicast service channel of the non-anchor carriers, a multicast control channel of the non-anchor carriers, and a multicast control channel updating indication of the non-anchor carriers; transmitting, by the network side on the anchor carrier, a multicast control channel of the anchor carrier, a multicast control channel updating indication of the anchor carrier, first information for receiving the multicast control channel of the anchor carrier, second information for receiving the multicast control channel of the non-anchor carriers, third information for receiving the multicast control channel updating indication of the anchor carrier, and fourth information for receiving the multicast control channel updating indication of the non-anchor carriers.

Optionally, transmitting the information about the multicast service by the network side on the carriers, includes: transmitting, by the network side on the non-anchor carriers, a multicast service channel of the non-anchor carriers and a multicast control channel updating indication of the non-anchor carriers; transmitting, by the network side on the anchor carrier, a multicast control channel of the anchor carrier, a multicast control channel updating indication of the anchor carrier, third information for receiving the multicast control channel updating indication of the anchor carrier, fourth information for receiving the multicast control channel updating indication of the non-anchor carriers, and first information for receiving the multicast control channel of the anchor carrier.

Optionally, transmitting the information about the multicast service by the network side on the carriers, includes: transmitting, by the network side on the non-anchor carriers, a multicast service channel of the non-anchor carriers and a multicast control channel updating indication of the non-anchor carriers; transmitting, by the network side on the anchor carrier, a multicast control channel of the anchor carrier, first information for receiving the multicast control channel of the anchor carrier, and fourth information for receiving the multicast control channel updating indication of the non-anchor carriers.

Optionally, the multicast control channel of the anchor carrier carries information about non-anchor carriers supporting a multicast service.

Optionally, the information about the non-anchor carriers supporting the multicast service, includes: downlink operation frequency bins of the non-anchor carriers, uplink operation frequency bins of the non-anchor carriers, an index of the non-anchor carriers, a bitmap configuration of available downlink subframes, a downlink gap configuration, and information about in-band carriers.

Optionally, transmitting the information about the multicast service by the network side on the carriers, includes: transmitting, by the network side on the non-anchor carriers, a multicast service channel of the non-anchor carriers, a multicast control channel of the non-anchor carriers, and a multicast control channel updating indication of the non-anchor carriers; transmitting, by the network side on the anchor carrier, second information for receiving the multicast control channel of the non-anchor carriers, and fourth information for receiving the multicast control channel updating indication of the non-anchor carriers.

Optionally, the network side broadcasts information about the non-anchor carriers supporting the multicast service on the anchor carrier.

Optionally, the information about the non-anchor carriers supporting the multicast service includes: downlink operation frequency bins of the non-anchor carriers, uplink operation frequency bins of the non-anchor carriers, an index of the non-anchor carriers, a bitmap configuration of available downlink subframes, a downlink gap configuration, and information about in-band carriers.

Optionally, the first information for receiving the multicast control channel of the anchor carrier includes a repetition period, an offset, a first subframe, a duration and a updating period of the multicast control channel of the anchor carrier.

Optionally, the second information for receiving the multicast control channel of the non-anchor carriers includes: a repetition period, an offset, a first subframe, a duration and a updating period of the multicast control channel of the non-anchor carriers.

Optionally, the third information for receiving the multicast control channel updating indication of the anchor carrier includes: a repetition period, an offset, a first subframe, and a duration of the multicast control channel updating indication of the anchor carrier.

Optionally, the fourth information for receiving the multicast control channel updating indication of the non-anchor carriers includes: a repetition period, an offset, a first subframe, and a duration of the multicast control channel updating indication of the non-anchor carriers.

Some embodiments of the present disclosure further provide a method for receiving a multicast service, the method being applied in a terminal and including: receiving information about the multicast service transmitted by a network side on carriers, wherein the carriers are an anchor carrier and/or non-anchor carriers; selecting a target carrier from the carriers according to the information about the multicast service, and receiving the multicast service on the selected target carrier, wherein the target carrier is the anchor carrier and/or the non-anchor carrier.

Optionally, when the network side transmits, on the anchor carrier, fourth information for receiving a multicast control channel updating indication of the non-anchor carriers, the method further includes: receiving, by the terminal on the anchor carrier, the fourth information for receiving the multicast control channel updating indication of the non-anchor carriers, and receiving, on the non-anchor carriers according to the fourth information, a multicast control channel updating indication of the non-anchor carriers.

Optionally, the receiving, on the non-anchor carriers according to the fourth information, the multicast control channel updating indication of the non-anchor carriers, includes: receiving, on the non-anchor carriers according to the fourth information, a physical downlink control channel scrambled by using a predetermined radio network temporary identifier, and parsing the multicast control channel updating indication; or receiving, on the non-anchor carriers according to the fourth information, a predetermined radio resource control message, and parsing the multicast control channel updating indication.

Optionally, the fourth information for receiving the multicast control channel updating indication of the non-anchor carriers includes a repetition period, an offset, a first subframe, and a duration of the multicast control channel updating indication of the non-anchor carriers.

Optionally, the selecting a target carrier from the carriers according to the information about the multicast service, includes: receiving, by the terminal on the anchor carrier, information about the non-anchor carriers capable of supporting the multicast service; selecting a carrier supporting the multicast service as the target carrier, by the terminal from the carriers according to the information about the multicast service and information about the non-anchor carriers supporting the multicast service.

Optionally, when the multicast control channel of the anchor carrier transmitted on the anchor carrier by the network side carries the information about the non-anchor carriers supporting the multicast service, the receiving, by the terminal on the anchor carrier, information about the non-anchor carriers supporting the multicast service, includes: selecting, by the terminal from the information about the multicast service transmitted on the carriers, the multicast control channel of the anchor carrier transmitted on the anchor carrier; parsing the multicast control channel of the anchor carrier, and determining the information about the non-anchor carriers supporting the multicast service.

Optionally, when the network side broadcasts the information about the non-anchor carriers supporting the multicast service on the anchor carrier, the receiving, by the terminal on the anchor carrier, information about the non-anchor carriers supporting the multicast service, includes: receiving, by the terminal, a system message broadcast by the network side, and parsing the system message and determining the information about the non-anchor carriers supporting the multicast service.

Optionally, the information about the non-anchor carriers supporting the multicast service includes: downlink operation frequency bins of the non-anchor carriers, uplink operation frequency bins of the non-anchor carriers, an index of the non-anchor carriers, a bitmap configuration of available downlink subframes, a downlink gap configuration, and information about in-band carriers.

Optionally, when the network side transmits a multicast control channel of the anchor carrier on the anchor carrier and transmits first information for receiving the multicast control channel of the anchor carrier, the receiving the information about the multicast service transmitted by the network side on the carriers, includes: receiving the first information for receiving the multicast control channel of the anchor carrier, the first information being transmitted by the network side on the anchor carrier; receiving the multicast control channel of the anchor carrier on the anchor carrier according to the first information.

Optionally, when the network side transmits, on the anchor carrier, second information for receiving a multicast control channel of the non-anchor carriers, the receiving the information about the multicast service transmitted by the network side on the carriers, includes: receiving the second information for receiving the multicast control channel of the non-anchor carriers transmitted by the network side on the anchor carrier; receiving, on the non-anchor carriers, the multicast control channel of the non-anchor carriers according to the second information.

Optionally, contents transmitted by the network side in the multicast control channel of the anchor carrier include: a Public Land Mobile Network Identifier of the multicast services supported by the network side, a Temporary Mobile Group Identifier (TMGI) of the multicast services supported by the network side, scheduling information about the multicast service channel of the non-anchor carriers transmitted on the non-anchor carriers; or the contents transmitted by the network side in the multicast control channel of the non-anchor carriers include: the Public Land Mobile Network Identifier of the multicast services supported by the network side, the TMGI of the multicast services supported by the network side, scheduling information about the multicast service channel of the non-anchor carriers transmitted on the non-anchor carriers.

Optionally, when the network side transmits the multicast service channel of the anchor carrier on the anchor carrier, the contents transmitted by the network side in the multicast control channel of the anchor carrier further include: the scheduling information about the multicast service channel of the anchor carrier transmitted on the anchor carrier.

Optionally, the first information for receiving the multicast control channel of the anchor carrier includes: a repetition period, an offset, a first subframe, a duration and a updating period of the multicast control channel of the anchor carrier.

Optionally, the second information for receiving the multicast control channel of the non-anchor carriers includes: a repetition period, an offset, a first subframe, a duration and a updating period of the multicast control channel of the non-anchor carriers.

Optionally, the selecting the target carrier from the carriers according to the information about the multicast service, includes: determining, by the terminal, multicast services supported by the network side and information about carriers on which the multicast services are transmitted, according to the multicast control channel of the anchor carrier transmitted by the network side on the anchor carrier and/or the multicast control channel of the non-anchor carriers transmitted by the network side on the non-anchor carriers; selecting, as the target carrier, a carrier supporting the multicast service interested by the terminal.

Optionally, the selecting the target carrier from the carriers according to the information about the multicast service, includes: selecting carriers supporting the multicast service, by the terminal according to information about carriers transmitting the multicast service broadcast by the network side on the anchor carrier; receiving, by the terminal in the multicast control channel of the non-anchor carriers, the information about the multicast service supported by the non-anchor carriers transmitted by the network side on the non-anchor carriers; selecting, as the target carrier, a carrier supporting the multicast service interested by the terminal.

Optionally, the selecting, as the target carrier, a carrier supporting the multicast service interested by the terminal, includes: preferentially selecting, as the target carrier, by the terminal a carrier on which a reception time of the multicast service and a reception time of a paging do not conflict with each other; or randomly selecting, as the target carrier, by the terminal a carrier supporting the multicast service interested by the terminal.

Optionally, the method further includes: receiving, by the terminal on the target carrier, the multicast service channel of the multicast service interested by the terminal.

Optionally, if the multicast services transmitted on the carriers includes other multicast service interested by the terminal when the terminal receives the multicast service on the target carrier, the method further includes: receiving the multicast control channel updating indication of the anchor carrier on the anchor carrier, by the terminal according to third information for receiving the multicast control channel updating indication of the anchor carrier transmitted on the anchor carrier; and receiving information about multicast services supported by all carriers at the network side transmitted in the multicast control channel of the anchor carrier, according to the first information for receiving the multicast control channel of the anchor carrier transmitted on the anchor carrier; determining whether the multicast service interested by the terminal exists or not; and in a case that the multicast service interested by the terminal exists, receiving the multicast service on carriers transmitting the multicast service interested by the terminal; or receiving periodically, by the terminal on the anchor carrier, up-to-date information about the multicast services supported by all carriers at the network side transmitted in the multicast control channel of the anchor carrier, and determining by the terminal whether the multicast service interested by the terminal exists or not; and in a case that the multicast service interested by the terminal exists, receiving the multicast service interested by the terminal, by the terminal on carriers transmitting the multicast service interested by the terminal; wherein a length of a period of the periodic receiving is received by the terminal through a system broadcast or through a predetermined radio resource control message.

Optionally, when the network side transmits, on the anchor carrier, third information for receiving a multicast control channel updating indication of the anchor carrier, the method further includes: receiving, by the terminal on the anchor carrier, the third information for receiving the multicast control channel updating indication of the anchor carrier, and receiving the multicast control channel updating indication of the anchor carrier on the anchor carrier according to the third information.

Optionally, the third information for receiving the multicast control channel updating indication of the anchor carrier includes: a repetition period, an offset, a first subframe, and a duration of the multicast control channel updating indication of the anchor carrier.

Optionally, when the network side transmits a same multicast service in different non-anchor carriers, the selecting, as the target carrier, the carrier supporting the multicast service interested by the terminal includes: selecting, by the terminal as the target carrier, a single non-anchor carrier configured by the network side, wherein the single non-anchor carrier supports the multicast service interested by the terminal.

Optionally, after receiving the multicast service on the selected target carrier, the method further includes: reporting, on the selected target carrier, the multicast service interested by the terminal.

Some embodiments of the present disclosure further provide an apparatus for transmitting a multicast service. The apparatus is applied to a network side and includes: a transmission module, configured to transmit information about the multicast service on carriers, wherein the carriers are an anchor carrier and/or non-anchor carriers.

Optionally, the transmission module includes a first transmission submodule and a second transmission submodule, wherein the first transmission submodule is configured to transmit, on the non-anchor carriers, a multicast service channel of the non-anchor carriers, a multicast control channel of the non-anchor carriers, and a multicast control channel updating indication of the non-anchor carriers, the second transmission submodule is configured to transmit, on the anchor carrier, a multicast service channel of the anchor carrier, a multicast control channel of the anchor carrier, a multicast control channel updating indication of the anchor carrier, first information for receiving the multicast control channel of the anchor carrier, second information for receiving the multicast control channel of the non-anchor carriers, third information for receiving the multicast control channel updating indication of the anchor carrier, and fourth information for receiving the multicast control channel updating indication of the non-anchor carriers.

Optionally, the transmission module includes a third transmission submodule and a fourth transmission submodule, wherein the third transmission submodule is configured to transmit, on the non-anchor carriers, a multicast service channel of the non-anchor carriers, and a multicast control channel updating indication of the non-anchor carriers; and the fourth transmission submodule is configured to transmit, on the anchor carrier, a multicast service channel of the anchor carrier, a multicast control channel of the anchor carrier, a multicast control channel updating indication of the anchor carrier, first information for receiving the multicast control channel of the anchor carrier, third information for receiving the multicast control channel updating indication of the anchor carrier, and fourth information for receiving the multicast control channel updating indication of the non-anchor carriers.

Optionally, the transmission module includes a fifth transmission submodule and a sixth transmission submodule, wherein the fifth transmission submodule is configured to transmit, on the non-anchor carriers, a multicast service channel of the non-anchor carriers, a multicast control channel of the non-anchor carriers, and a multicast control channel updating indication of the non-anchor carriers; the sixth transmission submodule is configured to transmit, on the anchor carrier, a multicast control channel of the anchor carrier, a multicast control channel updating indication of the anchor carrier, first information for receiving the multicast control channel of the anchor carrier, second information for receiving the multicast control channel of the non-anchor carriers, third information for receiving the multicast control channel updating indication of the anchor carrier, and fourth information for receiving the multicast control channel updating indication of the non-anchor carriers.

Optionally, the transmission module includes a seventh transmission submodule and an eighth transmission submodule, wherein the seventh transmission submodule is configured to transmit, on the non-anchor carriers, a multicast service channel of the non-anchor carriers and a multicast control channel updating indication of the non-anchor carriers, the eighth transmission submodule is configured to transmit, on the anchor carrier, a multicast control channel of the anchor carrier, a multicast control channel updating indication of the anchor carrier, third information for receiving the multicast control channel updating indication of the anchor carrier, fourth information for receiving the multicast control channel updating indication of the non-anchor carriers, and first information for receiving the multicast control channel of the anchor carrier.

Optionally, the transmission module includes a ninth transmission submodule and a tenth transmission submodule, wherein the ninth transmission submodule is configured to transmit, on the non-anchor carriers, a multicast service channel of the non-anchor carriers and a multicast control channel updating indication of the non-anchor carriers, the tenth transmission submodule is configured to transmit, on the anchor carrier, a multicast control channel of the anchor carrier, first information for receiving the multicast control channel of the anchor carrier, and fourth information for receiving the multicast control channel updating indication of the non-anchor carriers.

Optionally, the multicast control channel of the anchor carrier carries information about the non-anchor carriers supporting the multicast service.

Optionally, the information about the non-anchor carriers supporting the multicast service includes: downlink operation frequency bins of the non-anchor carriers, uplink operation frequency bins of the non-anchor carriers, an index of the non-anchor carriers, a bitmap configuration of available downlink subframes, a downlink gap configuration, and information about in-band carriers.

Optionally, the transmission module includes an eleventh transmission submodule and a twelfth transmission submodule, wherein the eleventh transmission submodule is configured to transmit, on the non-anchor carriers, a multicast service channel of the non-anchor carriers, a multicast control channel of the anchor carrier, and a multicast control channel updating indication of the non-anchor carriers; the twelfth transmission submodule is configured to transmit, on the anchor carrier, second information for receiving the multicast control channel of the non-anchor carriers, and fourth information for receiving the multicast control channel updating indication of the non-anchor carriers.

Optionally, wherein, the network side broadcasts, on the anchor carrier, the information about the non-anchor carriers supporting the multicast service.

Optionally, the information about the non-anchor carriers supporting the multicast service includes downlink operation frequency bins of the non-anchor carriers, uplink operation frequency bins of the non-anchor carrier, an index of the non-anchor carriers, a bitmap configuration of available downlink subframes, a downlink gap configuration, and information about in-band carriers.

Optionally, the first information for receiving the multicast control channel of the anchor carrier includes a repetition period, an offset, a first subframe, a duration and a updating period of the multicast control channel of the anchor carrier.

Optionally, the second information for receiving the multicast control channel of the non-anchor carriers includes a repetition period, an offset, a first subframe, a duration and a updating period of the multicast control channel of the non-anchor carriers.

Optionally, the third information for receiving the multicast control channel updating indication of the anchor carrier includes a repetition period, an offset, a first subframe, and a duration of the multicast control channel updating indication of the anchor carrier.

Optionally, the fourth information for receiving the multicast control channel updating indication of the non-anchor carriers includes a repetition period, an offset, a first subframe, and a duration of the multicast control channel updating indication of the non-anchor carriers.

Some embodiments of the present disclosure provide an apparatus for receiving a multicast service. The apparatus is applied to a terminal and includes an information reception module and a service transmission module, wherein the information reception module is configured to receive information about the multicast service transmitted by a network side on carriers, wherein the carriers are an anchor carrier and/or non-anchor carriers, the service transmission module is configured to select a target carrier from the carriers according to the information about the multicast service, and receive the multicast service on the selected target carrier, wherein the target carrier is the anchor carrier or the non-anchor carrier.

Optionally, the apparatus further includes: a first indication reception module, configured to, when the network side transmits, on the anchor carrier, fourth information for receiving multicast control channel updating indication of the non-anchor carriers, receive, on the anchor carrier, the fourth information for receiving the multicast control channel updating indication of the non-anchor carriers, and receive the multicast control channel updating indication of the non-anchor carriers on the non-anchor carriers according to the fourth information.

Optionally, the indication reception module includes a first indication reception submodule or a second indication reception submodule, wherein the first indication reception module is configured to receive, on the non-anchor carriers according to the fourth information, a physical downlink control channel scrambled by using a predetermined radio network temporary identifier, and parse the multicast control channel updating indication; the second indication reception submodule is configured to receive the predetermined radio resource control message on the non-anchor carriers according to the fourth information, and parse the multicast control channel updating indication.

Optionally, the fourth information for receiving the multicast control channel updating indication of the non-anchor carriers includes a repetition period, an offset, a first subframe, and a duration of the multicast control channel updating indication of the non-anchor carriers.

Optionally, the service transmission module includes an information reception submodule and a carrier selection submodule, wherein the information reception submodule is configured to receive, on the anchor carrier, information about the non-anchor carriers supporting the multicast service; the carrier selection submodule is configured to select, as a target carrier, a carrier supporting the multicast service from the carriers according to the information about the multicast service and the information about the non-anchor carriers supporting the multicast service.

Optionally, the information reception submodule includes an information selection unit and a parsing unit, wherein the information selection unit is configured to, when the multicast control channel of the anchor carrier transmitted on the anchor carrier by the network side carries the information about the non-anchor carriers supporting the multicast service, select, from the information about the multicast service transmitted on the carriers, the multicast control channel of the anchor carrier transmitted on the anchor carrier; the parsing unit is configured to parse the multicast control channel of the anchor carrier, and determine the information about the non-anchor carriers supporting the multicast service.

Optionally, the information reception submodule includes a broadcast reception unit, the broadcast reception unit is configured to, when the network side broadcasts, on the anchor carrier, the information about the non-anchor carriers supporting the multicast service, receive a system message broadcast by the network side, and parse the system message and determine the information about the non-anchor carriers supporting the multicast service.

Optionally, the information about the non-anchor carriers supporting the multicast service includes: downlink operation frequency bins of the non-anchor carriers, uplink operation frequency bins of the non-anchor carriers, an index of the non-anchor carriers, a bitmap configuration of available downlink subframes, a downlink gap configuration, and information about in-band carriers.

Optionally, the information reception module includes a first processing submodule and a second processing submodule, wherein the first processing submodule is configured to, when the network side transmits multicast control channel of the anchor carrier on the anchor carrier and transmit first information for receiving the multicast control channel of the anchor carrier, receive the first information for receiving the multicast control channel of the anchor carrier transmitted by the network side on the anchor carrier; the second processing submodule is configured to receive the multicast control channel of the anchor carrier on the anchor carrier according to the first information.

Optionally, the information reception module includes a third processing submodule and a fourth processing submodule, wherein the third processing submodule is configured to, when the network side transmits, on the anchor carrier, second information for receiving a multicast control channel of the non-anchor carriers, receive the second information for receiving the multicast control channel of the non-anchor carriers transmitted by the network side on the anchor carrier; the fourth processing submodule is configured to receive the multicast control channel of the non-anchor carriers on the non-anchor carriers according to the second information.

Optionally, contents transmitted by the network side in the multicast control channel of the anchor carrier include: a Public Land Mobile Network Identifier of multicast services supported by the network side, a Temporary Mobile Group Identifier (TMGI) of the multicast services supported by the network side, scheduling information about the multicast service channel of the non-anchor carriers transmitted on the non-anchor carriers; or contents transmitted by the network in the multicast control channel of the non-anchor carriers include the Public Land Mobile Network Identifier of the multicast services supported by the network side, the Temporary Mobile Group Identifier (TMGI) of the multicast services supported by the network side, scheduling information about the multicast service channel of the non-anchor carriers transmitted on the non-anchor carriers.

Optionally, when the network side transmits the multicast service channel of the anchor carrier on the anchor carrier, the contents transmitted by the network side in the multicast control channel of the anchor carrier further include: the scheduling information of the multicast service channel of the anchor carrier transmitted on the anchor carrier.

Optionally, the first information for receiving the multicast control channel of the anchor carrier includes a repetition period, an offset, a first subframe, a duration and an updating period of the multicast control channel of the anchor carrier.

Optionally, the second information for receiving the multicast control channel of the non-anchor carriers includes a repetition period, an offset, a first subframe, a duration and an updating period of the multicast control channel of the non-anchor carriers.

Optionally, the service transmission module includes a fifth processing submodule and a sixth processing submodule, wherein the fifth processing submodule is configured to determine information about multicast services supported by the network side and information about carriers on which the multicast services are transmitted, according to the multicast control channel of the anchor carrier transmitted by the network side on the anchor carrier and/or the multicast control channel of the non-anchor carriers transmitted by the network side on the non-anchor carriers; the sixth processing submodule is configured to select, as the target carrier, a carrier supporting the multicast service interested by the terminal.

Optionally, the service transmission module includes a first carrier selection submodule, an information reception submodule, and a second carrier selection submodule, wherein the first carrier selection submodule is configured to select carriers supporting the multicast service, according to the information about carriers transmitting the multicast services broadcast by the network side on the anchor carrier; the information reception submodule is configured to receive, in the multicast control channel of the non-anchor carriers, the information about the multicast service supported by the non-anchor carriers, the information about the multicast service supported by the non-anchor carriers being transmitted by the network side on the non-anchor carriers; the second carrier selection submodule is configured to select, as the target carrier, a carrier supporting the multicast service interested by the terminal.

Optionally, the sixth processing submodule includes a first selection unit and/or a second selection unit, wherein the first selection unit is configured to select preferentially, as the target carrier, a carrier on which a reception time of the multicast service and a reception time of a paging do not conflict with each other; the second selection unit is configured to select randomly, as the target carrier, a carrier supporting the multicast service interested by the terminal.

Optionally, the apparatus further includes: a service channel reception module, configured to receive, on the target carrier, the multicast service channel including the multicast service interested by the terminal.

Optionally, the apparatus further includes: a first selection module and/or a second selection module, wherein the first selection module is configured to, if the multicast services transmitted by the carriers include other multicast service interested by the terminal when the terminal receives the multicast service on the target carrier, receive, on the anchor carrier, the multicast control channel updating indication of the anchor carrier according to third information for receiving the multicast control channel updating indication of the anchor carrier, the third information being transmitted on the anchor carrier; receive information transmitted in the multicast control channel of the anchor carrier and about multicast services supported by all carriers at the network side, according to the first information for receiving the multicast control channel of the anchor carrier and transmitted on the anchor carrier; determine whether the multicast service interested by the terminal exists or not; and in a case that the multicast service interested by the terminal exists, receive the multicast service on the carrier transmitting the multicast service interested by the terminal; the second selection module is configured to receive periodically, on the anchor carrier, up-to-date information about the multicast services supported by all carriers at the network side transmitted in the multicast control channel of the anchor carrier; determine whether the multicast service interested by the terminal exists or not; and in a case that the multicast service interested by the terminal exists, receiving the multicast service interested by the terminal on a carrier transmitting the multicast service; wherein a length of a period of the periodic receiving is received by the terminal through a system broadcast or a predetermined radio resource control RRC message.

Optionally, the apparatus further includes a second indication reception module configured to, when the network side transmits, on the anchor carrier, third information for receiving multicast control channel updating indication of the anchor carrier, receive, on the anchor carrier, the third information for receiving the multicast control channel updating indication of the anchor carrier; and receive, on the anchor carrier according to the third information, the multicast control channel updating indication of the anchor carrier.

Optionally, the third information for receiving the multicast control channel updating indication of the anchor carrier includes a repetition period, an offset, a first subframe, and a duration of the multicast control channel updating indication of the anchor carrier.

Optionally, the sixth processing submodule includes a third selection unit, the third selection unit is configured to, when the network side transmits a same multicast service on different non-anchor carriers, select, as the target carrier, a single non-anchor carrier configured by the network side, wherein the single non-anchor carrier supports the multicast service interested by the terminal.

Optionally, the apparatus further includes: a report module, configured to report, on the selected target carrier, the multicast service interested by the terminal.

Some embodiments of the present disclosure provide an apparatus for transmitting a multicast service. The apparatus is applied to a network side and includes a processor; a storage connected to the processor through a bus interface; and a transceiver connected to the processor through the bus interface; wherein the storage is configured to store programs and data used by the processor when the processor performs operations, and the multicast service and the information about the multicast service is transmitted through the transceiver, and when the processor invokes and executes the programs and the data stored in the storage, the processor implements a function of a transmission module, wherein the transmission module is configured to transmit the information about the multicast service on carriers, the carriers are an anchor carrier and/or non-anchor carriers.

Some embodiments of the present disclosure provide an apparatus for receiving a multicast service. The apparatus is applied to a terminal and includes a processor; a storage connected to the processor through a bus interface; and a transceiver connected to the processor through the bus interface; wherein the storage is configured to store programs and data used by the processor when the processor performs operations, and the multicast service and the information about the multicast service is received through the transceiver, and when the processor invokes and executes the programs and the data stored in the storage, the processor implements functions of an information reception module and a service transmission module, wherein the information reception module is configured to receive the information about the multicast service on the carriers, the carriers are the anchor carrier and/or the non-anchor carriers; and the service transmission module is configured to select a target carrier from the carriers according to the information about the multicast service, wherein the target carrier is the anchor carrier or the non-anchor carriers.

The above technical solutions of the present disclosure at least have advantages as follow. In the method for transmitting the multicast service, the method for receiving the multicast service, the apparatus for transmitting the multicast service, and the apparatus for receiving the multicast service, the network side transmits the information about the multicast service on the carriers so that the terminal may select an anchor carrier or a non-anchor carrier according to the information about the multicast service. Some embodiments of the present disclosure may enable the terminal to select a carrier supporting the multicast service interested by the terminal when the non-anchor carriers support the multicast service, and to receive the multicast service, and thus loads on the anchor carrier may be reduced and complexity of the terminal may be simplified.

BRIEF DESCRIPTION OF THE DRAWINGS

FIG. 2 is a flowchart of basic steps of a method for transmitting a multicast service provided in some embodiments of the present disclosure;

FIG. 3 is a flowchart of basic steps of a method for receiving a multicast service provided in some embodiments of the present disclosure;

FIG. 4 is a structure diagram of an apparatus for transmitting a multicast service provided in some embodiments of the present disclosure;

FIG. 5 is a structure diagram of an apparatus for transmitting a multicast service and an apparatus for receiving a multicast service provided in some embodiments of the present disclosure.

DETAILED DESCRIPTION

Figure 1:
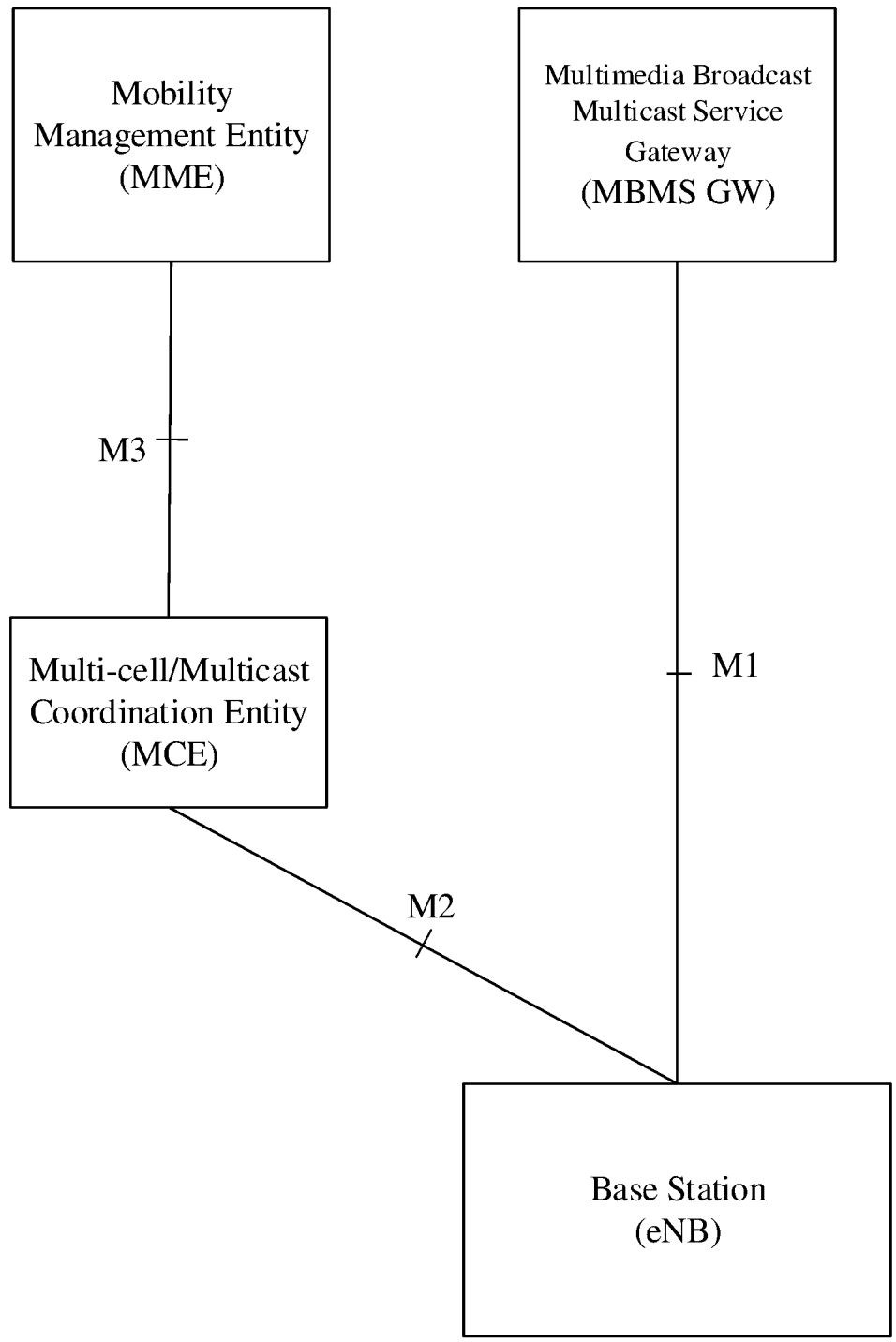
FIG. 1 is a logical architecture diagram of a multicast system.

To make technical problems to be solved, technical solutions, and advantages of the present disclosure clearer, specific embodiments will be described hereinafter in detail in combination with the drawings.

As shown in FIG. 2, some embodiments of the present disclosure provide a method for transmitting a multicast service. The method includes a step 21.

Step 21: transmitting information about the multicast service by a network side on carriers, wherein the carriers are an anchor carrier and/or non-anchor carriers.

Specifically, in some embodiments of the present disclosure, scenes of transmitting the information about the multicast service by the network side may include six scenes which are described below.

First Scene

The network side transmits, on non-anchor carriers, a multicast service channel of the non-anchor carriers, a multicast control channel of the non-anchor carriers, and a multicast control channel updating indication of the non-anchor carriers; the network side transmits, on the anchor carrier, a multicast service channel of the anchor carrier, a multicast control channel of the anchor carrier, a multicast control channel updating indication of the anchor carrier, first information for receiving the multicast control channel of the anchor carrier, second information for receiving the multicast control channel of the non-anchor carriers, third information for receiving the multicast control channel updating indication of the anchor carrier, and fourth information for receiving the multicast control channel updating indication of the non-anchor carriers.

Second Scene

The network side transmits, on the non-anchor carriers, the multicast service channel of the non-anchor carriers and the multicast control channel updating indication of the non-anchor carriers; the network side transmits, on the anchor carrier, the multicast service channel of the anchor carrier, the multicast control channel of the anchor carrier, the multicast control channel updating indication of the anchor carrier, the first information for receiving the multicast control channel of the anchor carrier, the third information for receiving the multicast control channel updating indication of the anchor carrier, and the fourth information for receiving the multicast control channel updating indication of the non-anchor carriers.

Third Scene

The network side transmits, on the non-anchor carriers, the multicast service channel of the non-anchor carriers, the multicast control channel of the non-anchor carriers, and the multicast control channel updating indication of the non-anchor carriers; the network side transmits, on the anchor carrier, the multicast control channel of the anchor carrier, the multicast control channel updating indication of the anchor carrier, the first information for receiving the multicast control channel of the anchor carrier, the second information for receiving the multicast control channel of the non-anchor carriers, the third information for receiving the multicast control channel updating indication of the anchor carrier, and the fourth information for receiving the multicast control channel updating indication of the non-anchor carriers.

Fourth Scene

The network side transmits, on the non-anchor carriers, the multicast service channel of the non-anchor carriers and the multicast control channel updating indication of the non-anchor carriers; the network side transmits, on the anchor carrier, the multicast control channel of the anchor carrier, the multicast control channel updating indication of the anchor carrier, the third information for receiving the multicast control channel updating indication of the anchor carrier, the fourth information for receiving the multicast control channel updating indication of the non-anchor carriers, and the first information for receiving the multicast control channel of the anchor carrier.

Fifth Scene

The network side transmits, on the non-anchor carriers, the multicast service channel of the non-anchor carriers and the multicast control channel updating indication of the non-anchor carriers; the network side transmits, on the anchor carrier, the multicast control channel of the anchor carrier, the first information for receiving the multicast control channel of the anchor carrier, and the fourth information for receiving the multicast control channel updating indication of the non-anchor carriers.

Sixth Scene

The network side transmits, on the non-anchor carriers, the multicast service channel of the non-anchor carriers, the multicast control channel of the non-anchor carriers, and the multicast control channel updating indication of the non-anchor carriers; the network side transmits, on the anchor carrier, the second information for receiving the multicast control channel of the non-anchor carriers, and the fourth information for receiving the multicast control channel updating indication of the non-anchor carriers.

It should be noted that multicast services transmitted by the network side on different non-anchor carriers in the above first to sixth scenes may be the same or different, and are not specifically defined herein.

Specifically, in some embodiments of the present disclosure, in the above first scene, the second scene, the third scene, and the fourth scene, the multicast control channel of the anchor carrier carries information about the non-anchor carriers supporting the multicast service. In the fifth scene, the multicast control channel of the anchor carrier carries information about the non-anchor carriers supporting the multicast service, or the network side broadcasts, on the anchor carrier, the information about the non-anchor carriers supporting the multicast service; and in the sixth scene, the network side broadcasts, on the anchor carrier, information about the non-anchor carriers supporting the multicast service.

Further, the information about the non-anchor carriers supporting the multicast service includes downlink operation frequency bins of the non-anchor carriers, uplink operation frequency bins of the non-anchor carriers, an index of the non-anchor carriers, a bitmap configuration of available downlink subframes, a downlink gap configuration, and information about in-band carriers.

Specifically, the first information for receiving the multicast control channel of the anchor carrier includes a repetition period, an offset, a first subframe, a duration and a updating period of the multicast control channel of the anchor carrier.

Specifically, in some embodiments of the present disclosure, the second information for receiving the multicast control channel of the non-anchor carriers includes a repetition period, an offset, a first subframe, a duration and a updating period of the multicast control channel of the non-anchor carriers.

Specifically, in some embodiments of the present disclosure, the third information for receiving the multicast control channel updating indication of the anchor carrier includes a repetition period, an offset, a first subframe, and a duration of the multicast control channel updating indication of the anchor carrier.

Specifically, in some embodiments of the present disclosure, the fourth information for receiving the multicast control channel updating indication of the non-anchor carriers includes a repetition period, an offset, a first subframe, and a duration of the multicast control channel updating indication of the non-anchor carriers.

According to the above, in some embodiments of the present disclosure, when the non-anchor carriers support the multicast service, the network side may transmit information about the multicast service on the anchor carrier and the non-anchor carriers, and loads on the anchor carrier may be reduced.

As shown in FIG. 3, some embodiments of the present disclosure provide a method for receiving a multicast service. The method for receiving the multicast service is applied in a terminal, and includes steps 31 and 32.

Step 31: receiving the information about the multicast service transmitted by the network side on the carriers, wherein the carriers are the anchor carrier and/or the non-anchor carriers.

Step 32: selecting a target carrier from the carriers according to the information about the multicast service, and receiving the multicast service on the selected target carrier, wherein the target carrier is the anchor carrier and/or the non-anchor carrier.

In some embodiments of the present disclosure, when the network side transmits the information about the multicast service on the anchor carrier and the non-anchor carriers, the terminal may autonomously select the target carrier and receive the multicast service on the target carrier. In actual applications, when the network side uses the first scene and the second scene to transmit the information about the multicast service, the terminal may receive the multicast service interested by the terminal on the anchor carrier or the non-anchor carriers; and when the network side uses the third scene, the fourth scene, the fifth scene and the sixth scene, the terminal may only receive the multicast service interested by the terminal on the non-anchor carriers.

Specifically, in some embodiments of the present disclosure, in the above scenes at the network side, i.e., when the network side transmits, on the anchor carrier, the fourth information for receiving the multicast control channel updating indication of the non-anchor carriers, the method for receiving the multicast service performed by the terminal may further includes: a step 33: receiving, by the terminal on the anchor carrier, the fourth information for receiving the multicast control channel updating indication of the non-anchor carriers, and receiving, on the non-anchor carriers according to the fourth information, the multicast control channel updating indication of the non-anchor carriers.

Specifically, the step 33 includes a substep 331 or a substep 332.

Substep 331: receiving, on the non-anchor carriers according to the fourth information, a physical downlink control channel scrambled by using a predetermined radio network temporary identifier (RNTI), and parsing the multicast control channel updating indication.

Substep 332: receiving, on the non-anchor carriers according to the fourth information, a predetermined radio resource control message, and parsing the multicast control channel updating indication.

That is, the multicast control channel updating indication may be the PDCCH scrambled by the SC-N-RNTI, or may be informed by using the specific RRC message.

Optionally, the fourth information for receiving the multicast control channel updating indication of the non-anchor carriers includes the repetition period, the offset, the first subframe, and the duration of the multicast control channel updating indication of the non-anchor carriers.

Further, since not all non-anchor carriers may support the multicast service, the terminal may need to know information about non-anchor carriers capable of supporting the multicast service for purpose of facilitating the terminal to select the target carrier, when the terminal selects the target carrier. In some embodiments of the present disclosure, the step 32 includes substeps 321-322.

Substep 321: receiving, by the terminal on the anchor carrier, information about the non-anchor carriers capable of supporting the multicast service.

Substep 322: selecting a carrier capable of supporting the multicast service as the target carrier, from carriers by the terminal according to the information about the multicast service and the information about the non-anchor carriers capable of supporting the multicast service.

It should be noted that, a quantity of the selected target carrier may be one or more.

Specifically, the information about the non-anchor carriers capable of supporting the multicast service may be transmitted on the anchor carrier in two ways. The first way is when the multicast control channel of the anchor carrier transmitted on the anchor carrier by the network side carries the information about the non-anchor carriers supporting the multicast service, i.e., when the network side uses the first scene, the second scene, the third scene, the fourth scene or the fifth scene, the substep 321 includes: selecting, by the terminal from the information about the multicast service transmitted on the carriers, the multicast control channel of the anchor carrier transmitted on the anchor carrier; parsing the multicast control channel of the anchor carrier, and determining the information about the non-anchor carriers supporting the multicast service.

The second way is when the network side broadcasts the information about the non-anchor carriers supporting the multicast service on the anchor carrier, i.e., when the network side uses the fifth scene or the sixth scene, the substep 321 includes: receiving, by the terminal, a system message broadcast by the network side, and parsing the system message and determining the information about the non-anchor carriers supporting the multicast service.

Optionally, the information about the non-anchor carriers supporting the multicast service includes the downlink operation frequency bins of the non-anchor carriers, the uplink operation frequency bins of the non-anchor carriers, the index of the non-anchor carriers, the bitmap configuration of available downlink subframes, the downlink gap configuration, and the information about in-band carriers.

It should be noted that, similar to the multicast control channel of the multicast service carrying scheduling of a multicast service channel, when the network side transmits the multicast control channel of the anchor carrier on the anchor carrier and transmits the first information for receiving the multicast control channel of the anchor carrier, the step 31 includes a substep 311 and a substep 312.

Substep 311: receiving the first information for receiving the multicast control channel of the anchor carrier transmitted by the network side on the anchor carrier.

Substep 312: receiving the multicast control channel of the anchor carrier on the anchor carrier according to the first information.

Optionally, when the network side transmits, on the anchor carrier, the second information for receiving the multicast control channel of the non-anchor carriers, the step 31 includes a substep 313 and a substep 314.

Substep 313: receiving the second information for receiving the multicast control channel of the non-anchor carriers transmitted by the network side on the anchor carrier.

Substep 314: receiving, on the non-anchor carriers, the multicast control channel of the non-anchor carriers according to the second information.

It should be noted that, contents transmitted by the network side in the multicast control channel of the anchor carrier in some embodiments of the present disclosure include: a Public Land Mobile Network Identifier of the multicast services supported by the network side, a Temporary Mobile Group Identifier (TMGI) of the multicast services supported by the network side, scheduling information about the multicast service channel of the non-anchor carriers transmitted on the non-anchor carriers; or the contents transmitted by the network side in the multicast control channel of the non-anchor carriers include the Public Land Mobile Network Identifier of the multicast services supported by the network side, the Temporary Mobile Group Identifier (TMGI) of the multicast services supported by the network side, scheduling information about the multicast service channel of the non-anchor carriers transmitted on the non-anchor carriers.

It should be further noted that, in some embodiments of the present disclosure, when the network side transmits the multicast service channel of the anchor carrier on the anchor carrier, the contents transmitted by the network side in the multicast control channel of the anchor carrier further include: the scheduling information about the multicast service channel of the anchor carrier transmitted on the anchor carrier.

Optionally, the first information for receiving the multicast control channel of the anchor carrier includes the repetition period, the offset, the first subframe, the duration and the updating period of the multicast control channel of the anchor carrier.

Optionally, the second information for receiving the multicast control channel of the non-anchor carriers includes the repetition period, the offset, the first subframe, the duration and the updating period of the multicast control channel of the non-anchor carriers.

In some embodiments of the present disclosure, the step 32 may include a substep 323 and a substep 324.

Substep 323: determining, by the terminal, multicast services supported by the network side and information about carriers on which the multicast services are transmitted, according to the multicast control channel of the anchor carrier transmitted by the network side on the anchor carrier and/or the multicast control channel of the non-anchor carriers transmitted by the network side on the non-anchor carriers.

Substep 324: selecting a carrier supporting the multicast service interested by the terminal as the target carrier.

Optionally, the step 32 includes substeps 325-327.

Substep 325: selecting carriers supporting the multicast service, by the terminal according to information about carriers transmitting the multicast service broadcast by the network side on the anchor carrier.

Substep 326: receiving, by the terminal in the multicast control channel of the non-anchor carriers, the information about the multicast service supported by the non-anchor carriers transmitted by the network side on the non-anchor carriers.

Substep 327: selecting a carrier supporting the multicast service interested by the terminal as the target carrier.

Specifically, the substep 324 or the substep 327 includes: selecting, as the target carrier, preferentially by the terminal a carrier on which a reception time of the multicast service and a reception time of a paging do not conflict with each other, or randomly selecting, as the target carrier, by the terminal a carrier supporting the multicast service interested by the terminal.

It should be noted that, after the terminal determines the target carrier, the method further includes receiving, on the target carrier, the multicast service channel of the multicast service interested by the terminal.

It should be explained that, in some embodiments of the present disclosure, if the multicast services transmitted on the carriers include other multicast services interested by the terminal when the terminal receives the multicast service on the target carrier, the method further includes: receiving the multicast control channel updating indication of the anchor carrier on the anchor carrier by the terminal according to the third information for receiving the multicast control channel updating indication of the anchor carrier transmitted on the anchor carrier, and receiving information about multicast services supported by all carriers at the network side transmitted in the multicast control channel of the anchor carrier, according to the first information for receiving the multicast control channel of the anchor carrier transmitted on the anchor carrier; determining whether the multicast service interested by the terminal exists or not; and in a case that the multicast service interested by the terminal exists, receiving the multicast service on carriers transmitting the multicast service interested by the terminal. Optionally, the method further includes: receiving periodically, by the terminal on the anchor carrier, up-to-date information about the multicast services supported by all carriers at the network side transmitted in the multicast control channel of the anchor carrier, and determining by the terminal whether the multicast service interested by the terminal exists or not; and in a case that the multicast service interested by the terminal exists, receiving, by the terminal on carriers transmitting the multicast service interested by the terminal, the multicast service interested by the terminal; wherein a length of a period of the periodic receiving is received by the terminal through the system broadcast or through the predetermined radio resource control (RRC) message.

Specifically, when the network side transmits, on the anchor carrier, the third information for receiving the multicast control channel updating indication of the anchor carrier, the method may further includes: receiving, by the terminal on the anchor carrier, the third information for receiving the multicast control channel updating indication of the anchor carrier, and receiving the multicast control channel updating indication of the anchor carrier on the anchor carrier according to the third information.

Specifically, the third information for receiving the multicast control channel updating indication of the anchor carrier includes the repetition period, the offset, the first subframe, and the duration of the multicast control channel updating indication of the anchor carrier.

Specifically, when the network side transmits the same multicast service in different non-anchor carriers (i.e., the network side uses the fifth scene or the sixth scene), the selecting, as the target carrier, the carrier supporting the multicast service interested by the terminal includes: selecting, by the terminal, a single non-anchor carrier configured by the network side as the target carrier, wherein the single non-anchor carrier supports the multicast service interested by the terminal.

Further, after receiving the multicast service on the selected target carrier, the method further includes: reporting, on the selected target carrier, the multicast service interested by the terminal.

According to the above, in order to describe more clearly the method for transmitting the multicast service and the method for receiving the multicast service provided in the present disclosure, detailed description of how the terminal receives the multicast service is provided with respect to the six scenes.

First Example

In the first scene, the multicast services transmitted on different non-anchor carriers by the network side may be the same or different and are not specifically limited herein. The network side transmits, on the non-anchor carriers, the multicast service channel of the non-anchor carriers, the multicast control channel of the non-anchor carriers, and the multicast control channel updating indication of the non-anchor carriers; the network side transmits, on the anchor carrier, the multicast service channel of the anchor carrier, the multicast control channel of the anchor carrier, the multicast control channel updating indication of the anchor carrier, first information for receiving the multicast control channel of the anchor carrier, second information for receiving the multicast control channel of the non-anchor carriers, third information for receiving the multicast control channel updating indication of the anchor carrier, and fourth information for receiving the multicast control channel updating indication of the non-anchor carriers.

Step 41: receiving and storing, by the terminal, information for receiving a SC-MCCH updating indication, the SC-MCCH updating indication, information for receiving the SC-MCCH and the SC-MCCH, transmitted on the anchor carrier, wherein the information for receiving the SC-MCCH updating indication includes, but is not limited to, the repetition period, the offset, the first subframe and the duration of the SC-MCCH updating indication transmitted in each carrier, and may probably further include repetition periods, offsets, first subframes and durations of SC-MCCH updating indications of all carriers transmitted on the anchor carrier, wherein the SC-MCCH updating indication includes the SC-MCCH updating indication of the anchor carrier and the SC-MCCH updating indications of all carriers, the information for receiving the SC-MCCH includes, but is not limited to: repetition periods, offsets, first subframes, durations, and updating periods of the SC-MCCH transmitted on the anchor carrier and the non-anchor carriers supporting a SC-PTM service; the information transmitted in the SC-MCCH may include, but is not limited to, the PLMN identifier of the SC-PTM service supported by the network side, the TMGI, carrier information for transmitted a SC-PTM service, and scheduling information for SC-MTCH transmitted on the anchor carrier; and SC-PTM service information includes, but is not limited to, the PLMN identifier, the TMGI, and the carrier information for transmitting the SC-PTM service; the information about non-anchor carriers supporting the SC-PTM service includes, but is not limited to, the downlink operation frequency bins for the non-anchor carriers, the uplink operation frequency bins, the index of the non-anchor carriers (explicitly or implicitly), the bitmap configuration of downlink available subframes, the downlin gap configuration, the information about the in-band carriers, and the like.

Step 42: when the SC-PTM service received by the terminal in step 41 includes the SC-PTM service interested by the terminal and the terminal may operate on the carriers supporting the SC-PTM service interested by the terminal, preferentially selecting, by the terminal, a carrier on which the reception time of the SC-PTM service and the reception time of the paging do not conflict with each other for receiving the SC-PTM service, or randomly selecting, by the terminal, the carrier supporting the SC-PTM service interested by the terminal for receiving the SC-PTM service, and proceeding to a step 43a, step 43b or a step 44; otherwise obtaining the SC-PTM service interested by the terminal according to a current procedure and through a unicast mode, wherein the procedure may proceed to the step 44.

Step 43a: when the terminal selects to receive the SC-PTM service on the non-anchor carriers, In a case that the terminal receives the SC-MCCH updating indication on the non-anchor carriers according to the information for receiving the SC-MCCH updating indication in the step 41, the indication may be the PDCCH scrambled by the SC-N-RNTI or may be transmitted through the dedicated RRC message, and when the indication indicates that the SC-MCCH is updated, updating the SC-MCCH information on the non-anchor carriers; when the updated SC-MCCH information indicates the SC-PTM service transmitted on the non-anchor carriers includes the SC-PTM service interested by the terminal, continuing to receive the SC-PTM service by the terminal on the carrier; when the SC-PTM service transmitted on the non-anchor carriers does not include the SC-PTM service interested by the terminal, stopping, by the terminal, receiving the SC-PTM service on the carrier; or when the terminal fails to receive the SC-MCCH updating indication of the SC-MCCH on the non-anchor carriers, using previous SC-MCCH information on the non-anchor carriers by the terminal; and reporting the SC-PTM service interested by the terminal on the non-anchor carriers using a current mechanism by the terminal;

receiving the SC-MTCH by the terminal according to the obtained information about the SC-MTCH transmitted in the SC-MCCH.

Step 43b: when the terminal selects to receive the SC-PTM service on the anchor carrier, when the terminal receives, on the anchor carrier, the SC-MCCH updating indication transmitted on the anchor carrier, wherein the indication may be the PDCCH scrambled by the SC-N-RNTI or may be transmitted through the dedicated RRC message, and when the indication indicates that the SC-MCCH is updated, updating the SC-MCCH information by the terminal; when the updated SC-MCCH information indicates the SC-PTM service transmitted on the carriers includes the SC-PTM service interested by the terminal, continuing to select the carrier for receiving the SC-PTM service by the terminal; when the SC-PTM service transmitted on the carriers does not include the SC-PTM service interested by the terminal, stopping, by the terminal, receiving the SC-PTM service on the carrier; or when the terminal fails to receive, on the anchor carrier, the SC-MCCH updating indication of the SC-MCCH on the anchor carrier, using the previous SC-MCCH information on the anchor carrier by the terminal; and reporting the SC-PTM service interested by the terminal on the anchor carrier using a current mechanism by the terminal;

receiving the SC-MTCH by the terminal according to the obtained information about the SC-MTCH transmitted in the SC-MCCH.

Step 44: when the terminal has other SC-PTM services interested by the terminal, receiving the SC-MCCH updating indication on the anchor carrier by the terminal using the information (the repetition periods, the offsets, the first subframes and the durations of the SC-MCCH updating indications of all carriers transmitted on the anchor carrier) for receiving the SC-MCCH updating indication in step 41; and receiving, by the terminal using the information for receiving the SC-MCCH in the step 41, the information about the SC-PTM services supported by all carriers at the network side transmitted in the SC-MCCH; determining whether the SC-PTM service interested by the terminal exists or not; when the SC-PTM service interested by the terminal exists, repeating steps 42 to 44, otherwise continuing current processes;

or receiving, by the terminal on the anchor carrier periodically, up-to-date information about the SC-PTM services supported by all carriers at the network side transmitted in the SC-MCCH; determining whether the SC-PTM service interested by the terminal exists or not; when the SC-PTM service interested by the terminal exists, repeating steps 42 to 44, otherwise continuing current processes; information about the period of the periodic receiving may be transmitted to the terminal through the system broadcast or through the dedicated RRC message.

It should be noted that, the step 43a or the step 43b may be performed concurrently with the step 44, and a sequence for performing the steps are not restricted.

Second Example

The multicast services transmitted by the network side in different non-anchor carriers in the above second scene may be the same or different, and are not specifically defined herein.

The network side transmits, on the non-anchor carriers, the multicast service channel of the non-anchor carriers and the multicast control channel updating indication of the non-anchor carriers; the network side transmits, on the anchor carrier, the multicast service channel of the anchor carrier, the multicast control channel of the anchor carrier, the multicast control channel updating indication of the anchor carrier, the first information for receiving the multicast control channel of the anchor carrier, the third information for receiving the multicast control channel updating indication of the anchor carrier, and the fourth information for receiving the multicast control channel updating indication of the non-anchor carriers.

Step 51: receiving and storing, by the terminal, information for receiving the SC-MCCH updating indication, the SC-MCCH updating indication, and the SC-MCCH, transmitted on the anchor carrier, wherein the information for receiving the SC-MCCH updating indication includes, but is not limited to, the repetition period, the offset, the first subframe and the duration of the SC-MCCH updating indication transmitted on each carrier, and may further include the repetition periods, the offsets, the first subframes and the durations of SC-MCCH updating indications of all carriers transmitted on the anchor carrier, and the SC-MCCH updating indication includes the SC-MCCH updating indication of the anchor carrier and the SC-MCCH updating indications of all carriers; the information for receiving the SC-MCCH includes, but is not limited to: the repetition period, the offset, the first subframe, the duration, and the updating period of the SC-MCCH transmitted on the anchor carrier; the information transmitted in the SC-MCCH may include, but is not limited to, the PLMN identifier of the SC-PTM service supported by the network side, the TMGI, the carrier information for transmitting a SC-PTM service, and scheduling information for SC-MTCH transmitted in each carrier; and information about the non-anchor carriers supporting the SC-PTM services includes, but is not limited to, the downlink operation frequency bins for the non-anchor carriers, the uplink operation frequency bins, the index of the non-anchor carriers (explicitly or implicitly), the bitmap configuration of downlink available subframes, the downlink gap configuration, the information about the in-band carriers, and the like.

Step 52: when the SC-PTM service received by the terminal in step 51 includes the SC-PTM service interested by the terminal and the terminal may operate on carriers supporting the SC-PTM service interested by the terminal, preferentially selecting, by the terminal, a carrier on which the reception time of the SC-PTM service and the reception time of the paging do not conflict with each other for receiving the SC-PTM service; or randomly selecting, by the terminal, the carrier supporting the SC-PTM service interested by the terminal for receiving the SC-PTM service, and proceeding to a step 53a, a step 53b or a step 54; or obtaining the SC-PTM service interested by the terminal according to a current procedure and through a unicast mode, wherein the procedure may proceed to the step 54.

Step 53a: when the terminal selects to receive the SC-PTM service on the non-anchor carriers, when the terminal receives the SC-MCCH updating indication on the non-anchor carriers according to the information for receiving the SC-MCCH updating indication in the step 51, wherein the indication may be the PDCCH scrambled by the SC-N-RNTI or may be transmitted through the dedicated RRC message, and the indication is an indication indicating whether a configuration for the SC-PTM on current non-anchor carriers is changed or not, when the indication indicates that the SC-MCCH is updated, updating the SC-MCCH information on the anchor carrier; when information about the updated SC-MCCH indicates the SC-PTM service transmitted on the non-anchor carriers include thes SC-PTM service interested by the terminal, continuing to receive the SC-PTM service by the terminal on the carriers; when the SC-PTM service transmitted on the non-anchor carriers does not include the SC-PTM service interested by the terminal, stopping, by the terminal, receiving the SC-PTM service on the carriers; or when the terminal fails to receive the SC-MCCH updating indication on the non-anchor carriers, using the previous SC-MCCH information on the non-anchor carriers by the terminal; and reporting the SC-PTM service interested by the terminal on the non-anchor carriers using a current mechanism by the terminal;

receiving the SC-MTCH by the terminal according to the obtained information about the SC-MTCH transmitted in the SC-MCCH.

Step 53b: when the terminal selects to receive the SC-PTM service on the anchor carrier, when the terminal receives, on the anchor carrier, the SC-MCCH updating indication of the anchor carrier, wherein the indication may be the PDCCH scrambled by the SC-N-RNTI or may be transmitted through the dedicated RRC message, and the indication is an indication indicating whether the SC-PTM configuration on the current anchor carrier is changed or not; when the indication indicates that the SC-MCCH is updated, updating the SC-MCCH information by the terminal; when the updated SC-MCCH information indicates the SC-PTM service transmitted on the carrier includes the SC-PTM service interested by the terminal, continuing to select the carrier for receiving the SC-PTM service by the terminal; when the SC-PTM service does not include the SC-PTM service interested by the terminal, stopping, by the terminal, receiving the SC-PTM service on the carrier; or when the terminal fails to receive, on the anchor carrier, the SC-MCCH updating indication of the SC-MCCH transmitted on the anchor carrier, using the previous SC-MCCH information on the anchor carrier by the terminal; and reporting the SC-PTM service interested by the terminal on the anchor carrier using a current mechanism by the terminal;

receiving the SC-MTCH by the terminal according to the obtained information about the SC-MTCH transmitted in the SC-MCCH.

Step 54: when the terminal has other SC-PTM services interested by the terminal, receiving the SC-MCCH updating indication on the anchor carrier by the terminal using the information (the information includes, but is not limited to, the repetition periods, the offsets, the first subframes and the durations of the SC-MCCH updating indications of all carriers transmitted on the anchor carrier) for receiving the SC-MCCH updating indication in step 51; and receiving, by the terminal using the information for receiving the SC-MCCH in the step 1, the information about the SC-PTM services supported by all carriers at the network side transmitted in the SC-MCCH; determining whether the SC-PTM service interested by the terminal exists or not; when the SC-PTM service interested by the terminal exists, repeating steps 52 to 54, otherwise continuing current processes;

or receiving, by the terminal on the anchor carrier periodically, up-to-date information about the SC-PTM services supported by all carriers at the network side transmitted in the SC-MCCH; determining whether the SC-PTM service interested by the terminal exists or not; when the SC-PTM service interested by the terminal exists, repeating steps 52 to 54, otherwise continuing current processes; information about the period of the periodic receiving may be transmitted to the terminal through the system broadcast or through the dedicated RRC message.

It should be noted that, the step 53a or the step 53b may be performed concurrently with the step 54, and a sequence for performing the steps are not restricted.

Third Example

The multicast services transmitted by the network side on different non-anchor carriers in the above third scene may be the same or different, and are not specifically defined herein.

The network side transmits, on the non-anchor carriers, the multicast service channel of the non-anchor carriers, the multicast control channel of the non-anchor carriers, and the multicast control channel updating indication of the non-anchor carriers. The network side transmits, on the anchor carrier, the multicast control channel of the anchor carrier, the multicast control channel updating indication of the anchor carrier, the first information for receiving the multicast control channel of the anchor carrier, the second information for receiving the multicast control channel of the non-anchor carriers, the third information for receiving the multicast control channel updating indication of the anchor carrier, and the fourth information for receiving the multicast control channel updating indication of the non-anchor carriers.

Step 61: receiving and storing, by the terminal, the information for receiving the SC-MCCH updating indication, the SC-MCCH updating indication, the information for receiving the SC-MCCH, and the SC-MCCH, transmitted on the anchor carrier, wherein the information for receiving the SC-MCCH updating indication includes, and is not limited to, the repetition period, the offset, the first subframe and the duration of the SC-MCCH updating indication transmitted on each carrier, and may further probably include the repetition periods, the offsets, the first subframes and the durations of SC-MCCH updating indications of all carriers transmitted on the anchor carrier, wherein the SC-MCCH updating indication is the SC-MCCH updating indication on the anchor carrier, the information for receiving the SC-MCCH includes, but is not limited to: the repetition period, the offset, the first subframe, the duration, and the updating period of the SC-MCCH transmitted on the anchor carrier and the non-anchor carriers supporting the SC-PTM service; the information transmitted in the SC-MCCH may include, but is not limited to, the PLMN identifier of the SC-PTM service supported by the network side, the TMGI, and the carrier information for transmitting a SC-PTM service, and the carrier information includes, but is not limited to, the downlink operation frequency bins for the non-anchor carriers, the uplink operation frequency bins, the index of the non-anchor carriers (explicitly or implicitly), the bitmap configuration of downlink available subframes, the downlin gap configuration, the information about the in-band carriers, and the like.

Step 62: when the SC-PTM service received by the terminal in step 61 includes the SC-PTM service interested by the terminal and the terminal may operate on the carriers supporting the SC-PTM service interested by the terminal, preferentially selecting, by the terminal, the carrier on which the reception time of the SC-PTM service and the reception time of the paging do not conflict with each other for receiving the SC-PTM service; or randomly selecting, by the terminal, the carrier supporting the SC-PTM service interested by the terminal for receiving the SC-PTM service, and proceeding to a step 63 or a step 64; otherwise obtaining the SC-PTM service interested by the terminal according to a current procedure through the unicast mode, wherein the procedure may include the step 64.

Step 63: when the terminal selects to receive the SC-PTM service on the non-anchor carriers, in a case that the terminal receives the SC-MCCH updating indication on the non-anchor carriers according to the information for receiving the SC-MCCH updating indication in the step 61, wherein the indication may be the PDCCH scrambled by the SC-N-RNTI or may be transmitted through the dedicated RRC message, and when the indication indicates that the SC-MCCH is updated, updating the SC-MCCH information by the terminal; when the updated SC-MCCH information indicates the SC-PTM service transmitted on the non-anchor carriers includes the SC-PTM service interested by the terminal, continuing to receive the SC-PTM service by the terminal on the carrier; when the SC-PTM service transmitted on the non-anchor carriers does not include the SC-PTM service interested by the terminal, stopping, by the terminal, receiving the SC-PTM service on the carriers; or when the terminal fails to receive the SC-MCCH updating indication on the non-anchor carriers, using previous SC-MCCH information on the non-anchor carriers by the terminal; and reporting the SC-PTM service interested by the terminal on the non-anchor carriers using the current mechanism by the terminal; receiving the SC-MTCH by the terminal according to the obtained information about the SC-MTCH transmitted in the SC-MCCH.

Step 64: when the terminal has other SC-PTM services interested by the terminal, receiving the SC-MCCH updating indication on the anchor carrier by the terminal using the information (the repetition periods, the offsets, the first subframes and the durations of the SC-MCCH updating indications of all carriers transmitted on the anchor carrier) for receiving the SC-MCCH updating indication in step 61; and receiving, by the terminal using the information for receiving the SC-MCCH on the anchor carrier in the step 1, the information about the SC-PTM services supported by all carriers at the network side transmitted in the SC-MCCH; determining whether the SC-PTM service interested by the terminal exists or not; when the SC-PTM service interested by the terminal exists, repeating steps 62 to 64, otherwise continuing current processes;

or receiving, by the terminal on the anchor carrier periodically, up-to-date information about the SC-PTM services supported by all carriers at the network side transmitted in the SC-MCCH; determining whether the SC-PTM service interested by the terminal exists or not; when the SC-PTM service interested by the terminal exists, repeating steps 62 to 64, otherwise continuing the current processes; information about the period of the periodic receiving may be transmitted to the terminal through the system broadcast or through the dedicated RRC message.

It should be noted that, the step 63 may be performed concurrently with the step 64, and a sequence for performing the steps are not restricted.

Fourth Example

The multicast services transmitted by the network side on different non-anchor carriers in the above fourth scene may be the same or different, and are not specifically defined herein.

The network side transmits, on the non-anchor carriers, the multicast service channel of the non-anchor carriers, and the multicast control channel updating indication of the non-anchor carriers. The network side transmits, on the anchor carrier, the multicast control channel of the anchor carrier, the multicast control channel updating indication of the anchor carrier, the third information for receiving the multicast control channel updating indication of the anchor carrier, the fourth information for receiving the multicast control channel updating indication of the non-anchor carriers, and the first information for receiving the multicast control channel of the anchor carrier.

Step 71: receiving and storing, by the terminal, information for receiving the SC-MCCH updating indication of the anchor carrier, the SC-MCCH updating indication, the information for receiving the SC-MCCH updating indication of the non-anchor carriers and the SC-MCCHs, transmitted on the anchor carrier, wherein the information for receiving the SC-MCCH updating indication of the non-anchor carriers includes, but is not limited to, the repetition period, the offset, the first subframe and the duration of the SC-MCCH updating indication transmitted on the non-anchor carriers supporting the SC-PTM service; the information for receiving the SC-MCCH updating indication of the anchor carrier includes the repetition period, the offset, the first subframe, and the duration of the SC-MCCH updating indication transmitted on the anchor carrier, wherein the SC-MCCH updating indication includes SCCH updating indication on the anchor carrier; the information for receiving the SC-MCCH includes, but is not limited to, the repetition period, the offset, the first subframe, the duration, and the updating period of the SC-MCCH transmitted on the anchor carrier; the information transmitted on the SC-MCCH includes, but is not limited to, the PLMN identifiers of the SC-PTM services supported by the network side, the TMGI, the carrier information for transmitting a SC-PTM service, and scheduling information for SC-MTCH transmitted on the non-anchor carriers supporting the SC-PTM service; and the carrier information for transmitting SC-PTM services includes, but is not limited to, the downlink operation frequency bins for the non-anchor carriers, the uplink operation frequency bins, the index of the non-anchor carriers (explicitly or implicitly), the bitmap configuration of downlink available subframes, the downlink gap configuration, the information about the in-band carriers, and the like.

Step 72: when the SC-PTM services received by the terminal in step 71 include the SC-PTM service interested by the terminal and the terminal may operate on the carriers supporting the SC-PTM service interested by the terminal, preferentially selecting, by the terminal, the carrier on which the reception time of the SC-PTM service and the reception time of the paging do not conflict with each other for receiving the SC-PTM service, or randomly selecting, by the terminal, the carrier supporting the SC-PTM service interested by the terminal for receiving the SC-PTM service, and proceeding to a step 73 or a step 74; otherwise obtaining the SC-PTM service interested by the terminal according to the current procedure through the unicast mode, wherein the procedure may include the step 74.

Step 73: when the terminal selects to receive the SC-PTM service on the non-anchor carriers, when the terminal receives the SC-MCCH updating indication on the non-anchor carriers according to the information for receiving the SC-MCCH updating indication of the non-anchor carriers in the step 71, wherein the indication may be the PDCCH scrambled by the SC-N-RNTI or may be transmitted through the dedicated RRC message, and the indication is an indication indicating whether a SC-PTM configuration on current non-anchor carriers is changed or not; when the indication indicates that the SC-MCCH is updated, updating the SC-MCCH information on the anchor carrier; when the updated SC-MCCH information indicates that the SC-PTM service transmitted on the non-anchor carriers includes the SC-PTM service interested by the terminal, continuing to receive the SC-PTM service by the terminal on the carriers; when the SC-PTM service transmitted on the non-anchor carriers does not include the SC-PTM service interested by the terminal, stopping, by the terminal, receiving the SC-PTM service on the carrier; or when the terminal fails to receive the SC-MCCH updating indication on the non-anchor carriers, using previous SC-MCCH information on the non-anchor carriers by the terminal; and reporting the SC-PTM service interested by the terminal on the non-anchor carriers using the current mechanism by the terminal; and receiving the SC-MTCH by the terminal according to the obtained information about the SC-MTCH transmitted in the SC-MCCH.

Step 74: when the terminal has other SC-PTM services interested by the terminal, receiving the SC-MCCH updating indication on the anchor carrier by the terminal using the information (the repetition periods, the offsets, the first subframes and the durations of the SC-MCCH updating indications of all carriers transmitted on the anchor carrier) for receiving the SC-MCCH updating indication of the anchor carrier in step 71; and receiving, by the terminal using the information for receiving the SC-MCCH in the step 1, the information about the SC-PTM services supported by all carriers at the network side transmitted in the SC-MCCH; determining whether the SC-PTM service interested by the terminal exists or not; when the SC-PTM service interested by the terminal exists, repeating steps 72 to 74, otherwise continuing current processes;

or receiving, by the terminal on the anchor carrier periodically, up-to-date information about the SC-PTM services supported by all carriers at the network side transmitted in the SC-MCCH; determining whether the SC-PTM service interested by the terminal exists or not; when the SC-PTM service interested by the terminal exists, repeating steps 72 to 74, otherwise continuing current processes; information about the period of the periodic receiving may be transmitted to the terminal through the system broadcast or through the dedicated RRC message.

It should be noted that, the step 73 may be performed concurrently with the step 74, and a sequence for performing the steps are not restricted.

Fifth Example

The multicast services transmitted by the network side on different non-anchor carriers in the above fifth scene may be the same or different, and are not specifically defined herein.

The network side transmits, on the non-anchor carriers, the multicast service channel of the non-anchor carriers, and the multicast control channel updating indication of the non-anchor carriers.

The network side transmits, on the anchor carrier, the multicast control channel of the anchor carrier, the first information for receiving the multicast control channel of the anchor carrier, and the fourth information for receiving the multicast control channel updating indication of the non-anchor carriers.

Step 81: receiving and storing, by the terminal, the information for receiving the SC-MCCH, the information for receiving the SC-MCCH updating indication, the SC-MCCH, and the information about the non-anchor carriers supporting the SC-PTM service, transmitted on the anchor carrier, wherein the information for receiving the SC-MCCH includes, but is not limited to, the repetition period, the offset, the first subframe, the duration, and the updating period of the SC-MCCH transmitted on the anchor carrier, and the information for receiving the SC-MCCH updating indication may include, but is not limited to, the information about the non-anchor carriers supporting the SC-PTM service and the repetition period, the offset, the first subframe and the duration of the SC-MCCH updating indication transmitted on the non-anchor carriers, and the information transmitted in the SC-MCCH includes, but is not limited to, the PLMN identifier of the SC-PTM service supported by the network side, the TMGI, the schedule information for the SC-MTCH transmitted on the non-anchor carriers; and the information about the non-anchor carriers supporting the SC-PTM service includes, but is not limited to, the downlink operation frequency bins for the non-anchor carriers, the uplink operation frequency bins, the index of the non-anchor carriers (explicitly or implicitly), the bitmap configuration of downlink available subframes, the downlink gap configuration, the information about the in-band carriers, and the like, and may be transmitted inn the SC-MCCH or be broadcast in the system message.

Step 82: receiving, by the terminal according to the information for receiving the SC-MCCH in the step 81, the SC-MCCH transmitted on the anchor carrier at the network side, and obtaining the information about the SC-PTM service transmitted on the non-anchor carriers, the information for receiving the SC-MTCH and the information about the non-anchor carriers transmitting the SC-PTM.

Step 83: when the SC-PTM service transmitted on the non-anchor carriers and obtained by the terminal in step 82 includes the SC-PTM service interested by the terminal, preferentially selecting, by the terminal, the carrier on which the reception time of the SC-PTM service and the reception time of the paging do not conflict with each other for receiving the SC-PTM service, or randomly selecting, by the terminal, the carrier supporting the SC-PTM service interested by the terminal for receiving the SC-PTM service.

When the terminal receives the SC-MCCH updating indication on the non-anchor carriers according to the information for receiving the SC-MCCH updating indication in the step 81, wherein the indication may be the PDCCH scrambled by the SC-N-RNTI or may be transmitted through the dedicated RRC message, and when the indication indicates that the SC-MCCH is updated, updating the SC-MCCH information on the anchor carrier by the terminal and stopping using the SC-MCCH information obtained in step 82; when the updated SC-MCCH information indicates the SC-PTM service transmitted on the non-anchor carriers includes the SC-PTM service interested by the terminal, continuing to receive the SC-PTM service by the terminal on the carriers; when the SC-PTM service transmitted on the non-anchor carriers does not include the SC-PTM service interested by the terminal, stopping, by the terminal, receiving the SC-PTM service on the carriers; otherwise continuing to use the previous SC-MCCH information and continuing to receive the SC-PTM service using the carriers;

reporting the SC-PTM service interested by the terminal on the non-anchor carriers using the current mechanism by the terminal;

transmitting the SC-MTCH and the SC-PTM service interested by the terminal on the non-anchor carriers by the network side, and receiving, by the terminal, the SC-MTCH on the non-anchor carriers using the information about the SC-MTCH transmitted in the SC-MCCH obtained in the step 82 or the step 83.

When the anchor carrier is used to receive the information about the SC-MCCH and/or the information for receiving the SC-MCCH updating indication is updated, the terminal repeats the above steps.

Sixth Example

The multicast services transmitted by the network side on different non-anchor carriers in the above sixth scene may be the same or different, and are not specifically defined herein.

The network side transmits, on the non-anchor carriers, the multicast service channel of the non-anchor carriers, the multicast control channel of the non-anchor carriers, and the multicast control channel updating indication of the non-anchor carriers.

The network side transmits, on the anchor carrier, the second information for receiving the multicast control channel of the non-anchor carriers, and the fourth information for receiving the multicast control channel updating indication of the non-anchor carriers.

Step 91: receiving and storing, by the terminal, the information for receiving the SC-MCCH, the information for receiving the SC-MCCH updating indication, and the information about the non-anchor carriers supporting the SC-PTM service, transmitted on the anchor carrier, wherein the information for receiving the SC-MCCH includes, but is not limited to, the repetition period, the offset, the first subframe and the duration, and the updating period of the SC-MCCH, and the information for receiving the SC-MCCH updating indication may include, but is not limited to, the repetition period, the offset, the first subframe and the duration of the SC-MCCH updating indication transmitted on the non-anchor carriers, and the information about the non-anchor carriers supporting the SC-PTM service includes, but is not limited to, the downlink operation frequency bins of the non-anchor carriers, the uplink operation frequency bins, the index of the non-anchor carriers (explicitly or implicitly), the bitmap configuration of downlink available subframes, the downlink gap configuration, the information about the in-band carriers, and the like, and may be broadcast in the system message.

Step 92: receiving, by the terminal, the SC-MCCH on corresponding non-anchor carriers according to the information for receiving the SC-MCCH in step 91; when the SC-PTM service transmitted on the non-anchor carriers and obtained by the terminal includes the SC-PTM service interested by the terminal, preferentially selecting, by the terminal, the carrier on which the reception time of the SC-PTM service and the reception time of the paging do not conflict with each other for receiving the SC-PTM service, or randomly selecting, by the terminal, a carrier supporting the SC-PTM service interested by the terminal for receiving the SC-PTM service;

receiving, by the terminal, the SC-MCCH and the SC-MCCH updating indication on a selected non-anchor carrier according to the information for receiving the SC-MCCH and the information for receiving the SC-MCCH updating indication in the step 91; when the terminal receives the SC-MCCH updating indication on the non-anchor carrier according to the information for receiving the SC-MCCH updating indication in the step 91, wherein the indication may be the PDCCH scrambled by the SC-N-RNTI or may be transmitted through the dedicated RRC message, and when the indication indicates that the SC-MCCH is updated, updating the SC-MCCH information on the non-anchor carrier; when the updated SC-MCCH information indicates the SC-PTM service transmitted on the non-anchor carrier includes the SC-PTM service interested by the terminal, continuing to receive the SC-PTM service by the terminal on the carrier; when the SC-PTM service transmitted on the non-anchor carrier does not include the SC-PTM service interested by the terminal, stopping, by the terminal, receiving the SC-PTM service on the carrier; when the terminal fails to receive the SC-MCCH updating indication on the non-anchor carrier, continuing to using the carrier to receive the SC-PTM service, and using previous SC-MCCH information on the non-anchor carrier by the terminal; and reporting the SC-PTM service interested by the terminal on the non-anchor carriers using the current mechanism by the terminal;

transmitting the SC-MTCH and the SC-PTM service interested by the terminal on the non-anchor carriers by the network side, and receiving, by the terminal, the SC-MTCH on the non-anchor carriers using the information about the SC-MTCH transmitted on the SC-MCCH obtained in the step 92 or the step 93.

When the anchor carrier is used to receive the information about the SC-MCCH and/or the information for receiving the SC-MCCH updating indication is updated, the terminal repeats the above steps.

According to the above, the method for transmitting the multicast service and the method for receiving the multicast service provided in some embodiments of the present disclosure may enable the terminal to receive the multicast service transmitted on the non-anchor carriers, thereby loads on the anchor carrier is reduced, and the complexity of the terminal is reduced, and the multicast service may be received.

In order to implement the above purposes, as shown in FIG. 4, some embodiments of the present disclosure further provide an apparatus for transmitting a multicast service, the apparatus is applied to the network side. The apparatus includes a transmission module 101, configured to transmit information about the multicast service on carriers, wherein the carriers are an anchor carrier and/or non-anchor carriers.

Specifically, the transmission module 101 provided in some embodiments of the present disclosure includes: a first transmission submodule and a second transmission submodule. The first transmission submodule is configured to transmit, on the non-anchor carriers, a multicast service channel of the non-anchor carriers, a multicast control channel of the non-anchor carriers, and a multicast control channel updating indication of the non-anchor carriers. The second transmission submodule is configured to transmit, on the anchor carrier, a multicast service channel of the anchor carrier, a multicast control channel of the anchor carrier, a multicast control channel updating indication of the anchor carrier, the first information for receiving the multicast control channel of the anchor carrier, second information for receiving the multicast control channel of the non-anchor carriers, third information for receiving the multicast control channel updating indication of the anchor carrier, and fourth information for receiving the multicast control channel updating indication of the non-anchor carriers.

Specifically, the transmission module 101 provided in some embodiments of the present disclosure includes a third transmission submodule and a fourth transmission submodule. The third transmission submodule is configured to transmit, on the non-anchor carriers, the multicast service channel of the non-anchor carriers, and the multicast control channel updating indication of the non-anchor carriers. The fourth transmission submodule is configured to transmit, on the anchor carrier, a multicast service channel of the anchor carrier, a multicast control channel of the anchor carrier, a multicast control channel updating indication of the anchor carrier, the first information for receiving the multicast control channel of the anchor carrier, the third information for receiving the multicast control channel updating indication of the anchor carrier, and the fourth information for receiving the multicast control channel updating indication of the non-anchor carriers.

Specifically, the transmission module 101 provided in some embodiments of the present disclosure includes a fifth transmission submodule and a sixth transmission submodule. The fifth transmission submodule is configured to transmit, on non-anchor carriers, a multicast service channel of the non-anchor carriers, a multicast control channel of the non-anchor carriers, and a multicast control channel updating indication of the non-anchor carriers. The sixth transmission submodule is configured to transmit, on the anchor carrier, the multicast control channel of the anchor carrier, a multicast control channel updating indication of the anchor carrier, the first information for receiving the multicast control channel of the anchor carrier, the second information for receiving the multicast control channel of the non-anchor carriers, the third information for receiving the multicast control channel updating indication of the anchor carrier, and the fourth information for receiving the multicast control channel updating indication of the non-anchor carriers.

Specifically, the transmission module 101 provided in some embodiments of the present disclosure includes a seventh transmission submodule and an eighth transmission submodule. The seventh transmission submodule is configured to transmit, on the non-anchor carriers, the multicast service channel of the non-anchor carriers and the multicast control channel updating indication of the non-anchor carriers. The eighth transmission submodule is configured to transmit, on the anchor carrier, the multicast control channel of the anchor carrier, the multicast control channel updating indication of the anchor carrier, the third information for receiving the multicast control channel updating indication of the anchor carrier, the fourth information for receiving the multicast control channel updating indication of the non-anchor carriers, and the first information for receiving the multicast control channel of the anchor carrier.

Specifically, the transmission module 101 provided in some embodiments of the present disclosure includes a ninth transmission submodule and a tenth transmission submodule. The ninth transmission submodule is configured to transmit, on the non-anchor carriers, the multicast service channel of the non-anchor carriers and the multicast control channel updating indication of the non-anchor carriers. The tenth transmission submodule is configured to transmit, on the anchor carrier, the multicast control channel of the anchor carrier, the first information for receiving the multicast control channel of the anchor carrier, and the fourth information for receiving the multicast control channel updating indication of the non-anchor carriers.

Specifically, in some embodiments of the present disclosure, the multicast control channel of the anchor carrier carries information about the non-anchor carriers supporting the multicast service.

Specifically, in some embodiments of the present disclosure, the information about the non-anchor carriers supporting the multicast service includes the downlink operation frequency bins of the non-anchor carriers, the uplink operation frequency bins of the non-anchor carriers, the index of the non-anchor carriers, the bitmap configuration of available downlink subframes, the downlink gap configuration, and the information about in-band carriers.

Specifically, the transmission module 101 provided in some embodiments of the present disclosure includes an eleventh transmission submodule and a twelfth transmission submodule. The eleventh transmission submodule is configured to transmit, on the non-anchor carriers, the multicast service channel of the non-anchor carriers, the multicast control channel of the anchor carrier, and the multicast control channel updating indication of the non-anchor carriers. The twelfth transmission submodule is configured to transmit, on the anchor carrier, the second information for receiving the multicast control channel of the non-anchor carriers, and the fourth information for receiving the multicast control channel updating indication of the non-anchor carriers.

Specifically, in some embodiments of the present disclosure, the network side broadcasts, on the anchor carrier, the information about the non-anchor carriers supporting the multicast service.

Specifically, in some embodiments of the present disclosure, the information about the non-anchor carriers supporting the multicast service includes the downlink operation frequency bins of the non-anchor carriers, the uplink operation frequency bins of the non-anchor carriers, the index of the non-anchor carriers, the bitmap configuration of available downlink subframes, the downlink gap configuration, and the information about in-band carriers.

Specifically, in some embodiments of the present disclosure, the first information for receiving the multicast control channel of the anchor carrier includes a repetition period, an offset, a first subframe, a duration and a updating period of the multicast control channel of the anchor carrier.

Specifically, in some embodiments of the present disclosure, the second information for receiving the multicast control channel of the non-anchor carriers includes a repetition period, an offset, a first subframe, a duration and a updating period of the multicast control channel of the non-anchor carriers.

Specifically, in some embodiments of the present disclosure, the third information for receiving the multicast control channel of the anchor carrier includes the repetition period, the offset, the first subframe, and the duration of the multicast control channel updating indication of the anchor carrier.

Specifically, in some embodiments of the present disclosure, the fourth information for receiving the multicast control channel updating indication of the non-anchor carriers includes the repetition period, the offset, the first subframe, and the duration of the multicast control channel updating indication of the non-anchor carriers.

It should be noted that, the apparatus for transmitting the multicast service provided in the present disclosure is an apparatus to which the method for transmitting the multicast service provided in some embodiments of the present disclosure is applied, and thus all contents in the above method for transmitting the multicast service provided in the present disclosure are applicable to the apparatus, and same or similar beneficial effects may be attained.

In order to implement the above purpose, as shown in FIG. 5, some embodiments of the present disclosure further provide an apparatus for transmitting the multicast service. The apparatus for transmitting the multicast service includes a processor 100; a storage 120 connected to the processor 100 through a bus interface; and a transceiver 110 connected to the processor 100 through the bus interface; wherein the storage is configured to store programs and data used by the processor 100 when the processor 100 performs operations, and the multicast service and the information about the multicast service is transmitted through the transceiver 110, and when the processor invokes and executes the programs and the data stored in the storage 120, the processor implements a function of the transmission module, wherein the transmission module is configured to transmit the information about the multicast service on the carrier, the carrier is the anchor carrier and/or the non-anchor carrier.

In FIG. 5, the bus interface may include any number of buses and bridges connected together. Specifically, a plurality of processors such as the processor 100 and a plurality of storages such as the storage 120 are connected together. The bus interface may also cause any other circuits such as a peripheral circuit, a voltage regulator and a power management circuit to be connected together. The circuits are known in the art, and thus detailed descriptions thereof are not further provided herein. The bus interface provides an interface. The transceiver 110 may include a plurality of elements such as receivers, transmitters, and units for communicating with other apparatus through a transmission medium. The processor 100 takes charge of a bus architecture and general processing. The storage 120 may store data used by the processor 100 when the processor 100 performs operations.

The processor 100 takes charge of the bus architecture and general processing. The storage 120 may store data used by the processor 100 when the processor 100 performs operations.

It should be noted that, the apparatus for transmitting the multicast service provided in the present disclosure is an apparatus to which the method for transmitting the multicast service provided in some embodiments of the present disclosure is applied, and thus all contents in the above method for transmitting the multicast service provided in the present disclosure are applicable to the apparatus, and same or similar beneficial effects may be attained.

Figure 6:
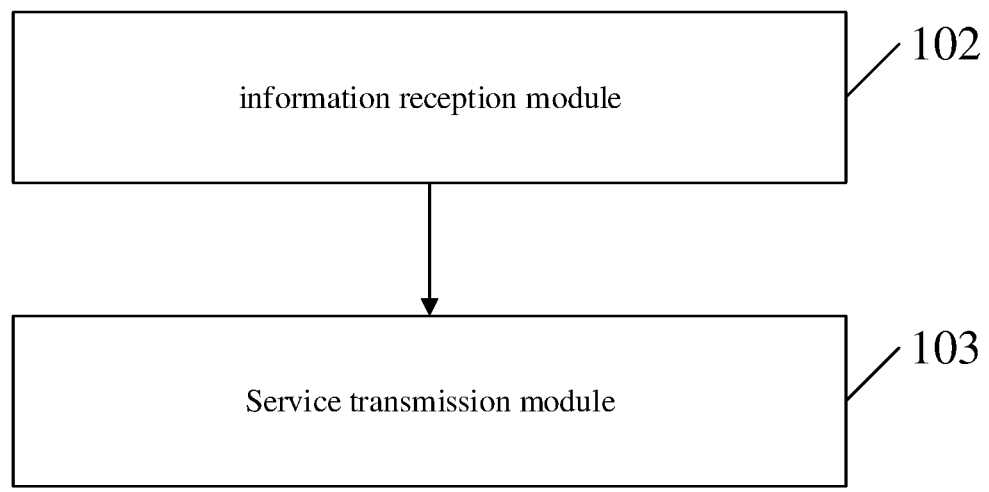
FIG. 6 is a structure diagram of an apparatus for receiving a multicast service provided in some embodiments of the present disclosure.

As shown in FIG. 6, some embodiments of the present disclosure further provide an apparatus for receiving a multicast service, wherein the apparatus is applied to a terminal. The apparatus includes an information reception module 102 and a service transmission module 103. The information reception module 102 is configured to receive the information about the multicast service transmitted by the network side on carriers, wherein the carriers are the anchor carrier and/or the non-anchor carrier. The service transmission module 103 is configured to select a target carrier from the carriers according to the information about the multicast service, and receive the multicast service on the selected target carrier, wherein the target carrier is the anchor carrier or the non-anchor carrier.

Specifically, in some embodiments of the present disclosure, the above apparatus further includes a first indication reception module. The first indication reception module is configured to, when the network side transmits the fourth information for receiving the multicast control channel updating indication of the non-anchor carriers on the anchor carrier, receive the fourth information for receiving the multicast control channel updating indication of the non-anchor carriers on the anchor carrier, and receive the multicast control channel updating indication of the non-anchor carriers on the non-anchor carriers according to the fourth information.

Specifically, in some embodiments of the present disclosure, the indication reception module includes a first indication reception submodule or a second indication reception submodule, wherein the first indication reception module is configured to receive, on the non-anchor carriers, a physical downlink control channel scrambled by using a predetermined radio network temporary identifier according to the fourth information, and parse the multicast control channel updating indication; the second indication reception submodule is configured to receive the predetermined radio resource control message on the non-anchor carriers according to the fourth information, and parse the multicast control channel updating indication.

Specifically, in some embodiments of the present disclosure, the fourth information for receiving the multicast control channel updating indication of the non-anchor carriers includes a repetition period, an offset, a first subframe, and a duration of the multicast control channel updating indication of the non-anchor carriers.

In some embodiments of the present disclosure, the service transmission module includes an information reception submodule and a carrier selection submodule. The information reception submodule is configured to receive, on the anchor carrier, information about the non-anchor carriers supporting the multicast service; and the carrier selection submodule is configured to select, as a target carrier, a carrier supporting the multicast service from the carriers according to the information about the multicast service and the information about the non-anchor carriers supporting the multicast service.

Specifically, in some embodiments of the present disclosure, the information reception submodule includes an information selection unit and a parsing unit. The information selection unit is configured to, when the multicast control channel of the anchor carrier transmitted on the anchor carrier by the network side carries the information about the non-anchor carriers supporting the multicast service, select, from the information about the multicast service transmitted on the carriers, the multicast control channel of the anchor carrier transmitted on the anchor carrier. The parsing unit is configured to parse the multicast control channel of the anchor carrier, and determine the information about the non-anchor carriers supporting the multicast service.

Specifically, in some embodiments of the present disclosure, the information reception submodule includes a broadcast reception unit. The broadcast reception unit is configured to when the network side broadcasts, on the anchor carrier, the information about the non-anchor carriers supporting the multicast service, receive a system message broadcast by the network side, and parse the system message and determine the information about the non-anchor carriers supporting the multicast service.

Specifically, in some embodiments of the present disclosure, the information about the non-anchor carriers supporting the multicast service includes the downlink operation frequency bins of the non-anchor carriers, the uplink operation frequency bins of the non-anchor carriers, the index of the non-anchor carriers, the bitmap configuration of available downlink subframes, the downlink gap configuration, and the information about in-band carriers.

Specifically, in some embodiments of the present disclosure, the information reception module includes a first processing submodule and a second processing submodule. The first processing submodule is configured to, when the network side transmits the multicast control channel of the anchor carrier on the anchor carrier and transmit the first information for receiving the multicast control channel of the anchor carrier, receive the first information for receiving the multicast control channel of the anchor carrier transmitted by the network side on the anchor carrier. The second processing submodule is configured to receive the multicast control channel of the anchor carrier on the anchor carrier according to the first information.

Specifically, in some embodiments of the present disclosure, the information reception module includes a third processing submodule and a fourth processing submodule. The third processing submodule is configured to, when the network side transmits, on the anchor carrier, the second information for receiving the multicast control channel of the non-anchor carriers, receive the second information for receiving the multicast control channel of the non-anchor carriers transmitted by the network side on the anchor carrier. The fourth processing submodule is configured to receive the multicast control channel of the non-anchor carriers on the non-anchor carriers according to the second information.

Specifically, contents transmitted by the network side in the multicast control channel of the anchor carrier in some embodiments of the present disclosure include: a Public Land Mobile Network Identifier of the multicast services supported by the network side, a Temporary Mobile Group Identifier (TMGI) of the multicast services supported by the network side, scheduling information about the multicast service channel of the non-anchor carriers transmitted on the non-anchor carriers; or the contents transmitted by the network in the multicast control channel of the non-anchor carriers include the Public Land Mobile Network Identifier of the multicast services supported by the network side, the Temporary Mobile Group Identifier (TMGI) of the multicast services supported by the network side, scheduling information about the multicast service channel of the non-anchor carriers transmitted on the non-anchor carriers.

Specifically, in some embodiments of the present disclosure, when the network side transmits the multicast service channel of the anchor carrier on the anchor carrier, the contents transmitted by the network side in the multicast control channel of the anchor carrier further include: the scheduling information of the multicast service channel of the anchor carrier transmitted on the anchor carrier.

Specifically, in some embodiments of the present disclosure, the first information for receiving the multicast control channel of the anchor carrier includes the repetition period, the offset, the first subframe, the duration and the updating period of the multicast control channel of the anchor carrier.

Specifically, in some embodiments of the present disclosure, the second information for receiving the multicast control channel of the non-anchor carriers includes the repetition period, the offset, the first subframe, the duration and the updating period of the multicast control channel of the non-anchor carriers.

Specifically, in some embodiments of the present disclosure, the service transmission module includes a fifth processing submodule and a sixth processing submodule. The fifth processing submodule is configured to determine information about multicast services supported by the network side and information about carriers on which the multicast services are transmitted, according to the multicast control channel of the anchor carrier transmitted by the network side on the anchor carrier and/or the multicast control channel of the non-anchor carriers transmitted on the non-anchor carriers by the network side. The sixth processing submodule is configured to select, as the target carrier, a carrier supporting the multicast service interested by the terminal.

Specifically, in some embodiments of the present disclosure, the service transmission module includes a first carrier selection submodule, an information reception submodule, and a second carrier selection submodule. The first carrier selection submodule is configured to select carriers supporting the multicast service, according to the information about carriers transmitting the multicast services broadcast by the network side on the anchor carrier. The information reception submodule is configured to receive, in the multicast control channel of the non-anchor carriers, the information about the multicast service supported by the non-anchor carriers transmitted by the network side on the non-anchor carriers, The second carrier selection submodule is configured to select, as the target carrier, a carrier supporting the multicast service interested by the terminal.

Specifically, in some embodiments of the present disclosure, the sixth processing submodule includes a first selection unit and/or a second selection unit. The first selection unit is configured to select preferentially, as the target carrier, a carrier on which a reception time of the multicast service and a reception time of a paging do not conflict with each other. The second selection unit is configured to select randomly, as the target carrier, a carrier supporting the multicast service interested by the terminal.

Specifically, in some embodiments of the present disclosure, the apparatus further includes a service channel reception module. The service channel reception module is configured to receive, on the target carrier, the multicast service channel including the multicast service interested by the terminal.

Specifically, in some embodiments of the present disclosure, the apparatus further includes a first selection module and/or a second selection module. The first selection module is configured to, if the multicast services transmitted by the carriers include other multicast service interested by the terminal when the terminal receives the multicast service on the target carrier, receive, on the anchor carrier, the multicast control channel updating indication of the anchor carrier according to the third information for receiving the multicast control channel updating indication of the anchor carrier transmitted on the anchor carrier; receive information about multicast services supported by all carriers at the network side transmitted in the multicast control channel of the anchor carrier, according to the first information for receiving the multicast control channel of the anchor carrier transmitted on the anchor carrier; determine whether the multicast service interested by the terminal exists or not; and in case that the multicast service interested by the terminal exists, receive the multicast service on the carrier transmitting the multicast service interested by the terminal. The second selection module is configured to receive periodically, on the anchor carrier, up-to-date information about the multicast services supported by all carriers at the network side transmitted in the multicast control channel of the anchor carrier; determine whether the multicast service interested by the terminal exists or not; and in case that the multicast service interested by the terminal exists, receiving the multicast service interested by the terminal on the carrier transmitting the multicast service; wherein a length of the period of the periodic receiving is received by the terminal through a system broadcast or a predetermined radio resource control (RRC) message.

Specifically, in some embodiments of the present disclosure, the above apparatus further includes a second indication reception module. The second indication reception module is configured to, when the network side transmits, on the anchor carrier, the third information for receiving the multicast control channel updating indication of the anchor carrier, receive, on the anchor carrier, the third information for receiving the multicast control channel updating indication of the anchor carrier; and receive, on the anchor carrier according to the third information, the multicast control channel updating indication of the anchor carrier.

Specifically, in some embodiments of the present disclosure, the third information for receiving the multicast control channel updating indication of the anchor carrier includes a repetition period, an offset, a first subframe, and a duration of the multicast control channel updating indication of the anchor carrier.

Specifically, in some embodiments of the present disclosure, the sixth processing submodule includes a third selection unit, The third selection unit is configured to, when the network side transmits the same multicast service on different non-anchor carriers, select, as the target carrier, a single non-anchor carrier configured by the network side, wherein the single non-anchor carrier supports the multicast service interested by the terminal.

Specifically, in some embodiments of the present disclosure, the apparatus further includes a report module. The report module is configured to report, on the selected target carrier, the multicast service interested by the terminal.

It should be noted that, the apparatus for receiving the multicast service provided in the present disclosure is an apparatus to which the method for receiving the multicast service provided in some embodiments of the present disclosure is applied, and thus all contents in the above method for receiving the multicast service provided in the present disclosure are applicable to the apparatus, and same or similar beneficial effects may be attained.

In order to implement the above purpose, as shown in FIG. 5, some embodiments of the present disclosure further provide an apparatus for receiving a multicast service. The apparatus for receiving the multicast service includes a processor 100; a storage 120 connected to the processor 100 through a bus interface; and a transceiver 110 connected to the processor 100 through the bus interface; wherein the storage is configured to store programs and data used by the processor 100 when the processor 100 performs operations, and the multicast service and the information about the multicast service are received through the transceiver 110, and when the processor invokes and executes the programs and the data stored in the storage 120, the processor implements functions of the information reception module 102 and the service transmission module 103, wherein the information reception module is configured to receive the information about the multicast service on the carriers, the carriers are the anchor carrier and/or the non-anchor carriers. The service transmission module 103 is configured to select the target carrier from the carriers according to the information about the multicast service, wherein the target carrier is the anchor carrier or the non-anchor carrier.

In FIG. 5, the bus interface may include any number of buses and bridges connected together. Specifically, one or more processors such as the processor 100 and a plurality of storages such as the storage 120 are connected together. The bus interface may also cause any other circuits such as a peripheral circuit, a voltage regulator and a power management circuit to be connected together. The circuits are known in the art, and thus detailed description thereof is not further provided herein. The bus interface provides an interface. The transceiver 110 may include a plurality of elements such as receivers, transmitters, and units for communicating with other apparatuses through a transmission medium. The processor 100 takes charge of the bus interface and general processing. The storage 120 may store data used by the processor 100 when the processor 100 performs operations.

The processor 100 takes charge of the bus interface and general processing. The storage 120 may store data used by the processor 100 when the processor 100 performs operations.

It should be noted that, the apparatus for receiving the multicast service provided in the present disclosure is an apparatus to which the method for receiving the multicast service provided in some embodiments of the present disclosure is applied, and thus all contents in the above method for receiving the multicast service provided in the present disclosure are applicable to the apparatus, and same or similar beneficial effects may be attained.

The above described embodiments of the present disclosure are optional embodiments. It should be noted that numerous modifications and embellishments may be made by one of ordinary skills in the art without departing from the spirit of the present disclosure, and such modifications and embellishments also fall within the scope of the present disclosure.

What is claimed is:

1. A method for transmitting a multicast service, comprising:

transmitting information about the multicast service by a network side on carriers, wherein the carriers are an anchor carrier and/or non-anchor carriers, wherein transmitting the information about the multicast service by the network side on the carriers, comprises:

transmitting by the network side, on the non-anchor carriers, a multicast service channel of the non-anchor carriers, a multicast control channel of the non-anchor carriers, and a multicast control channel updating indication of the non-anchor carriers; and transmitting by the network side, on the anchor carrier, a multicast service channel of the anchor carrier, a multicast control channel of the anchor carrier, a multicast control channel updating indication of the anchor carrier, first information for receiving the multicast control channel of the anchor carrier, second information for receiving the multicast control channel of the non-anchor carriers, third information for receiving the multicast control channel updating indication of the anchor carrier, and fourth information for receiving the multicast control channel updating indication of the non-anchor carriers; or the transmitting the information about the multicast service by the network side on the carriers, comprises:

transmitting, by the network side on the non-anchor carriers, a multicast service channel of the non-anchor carriers and a multicast control channel updating indication of the non-anchor carriers; and transmitting, by the network side transmits on the anchor carrier, a multicast service channel of the anchor carrier, a multicast control channel of the anchor carrier, a multicast control channel updating indication of the anchor carrier, first information for receiving the multicast control channel of the anchor carrier, third information for receiving the multicast control channel updating indication of the anchor carrier, and fourth information for receiving the multicast control channel updating indication of the non-anchor carriers; or the transmitting the information about the multicast service by the network side on the carriers, comprises:

transmitting, by the network side on the non-anchor carriers, a multicast service channel of the non-anchor carriers, a multicast control channel of the non-anchor carriers, and a multicast control channel updating indication of the non-anchor carriers; and transmitting, by the network side on the anchor carrier, a multicast control channel of the anchor carrier, a multicast control channel updating indication of the anchor carrier, first information for receiving the multicast control channel of the anchor carrier, second information for receiving the multicast control channel of the non-anchor carriers, third information for receiving the multicast control channel updating indication of the anchor carrier, and fourth information for receiving the multicast control channel updating indication of the non-anchor carriers; or the transmitting the information about the multicast service by the network side on the carriers, comprises:

transmitting, by the network side on the non-anchor carriers, a multicast service channel of the non-anchor carriers and a multicast control channel updating indication of the non-anchor carriers; and transmitting, by the network side on the anchor carrier, a multicast control channel of the anchor carrier, a multicast control channel updating indication of the anchor carrier, third information for receiving the multicast control channel updating indication of the anchor carrier, fourth information for receiving the multicast control channel updating indication of the non-anchor carriers, and first information for receiving the multicast control channel of the anchor carrier; or the transmitting the information about the multicast service by the network side on the carriers, comprises:

transmitting, by the network side on the non-anchor carriers, a multicast service channel of the non-anchor carriers and a multicast control channel updating indication of the non-anchor carriers; and transmitting, by the network side on the anchor carrier, a multicast control channel of the anchor carrier, first information for receiving the multicast control channel of the anchor carrier, and fourth information for receiving the multicast control channel updating indication of the non-anchor carriers.

2. The method according to claim 1, wherein, the multicast control channel of the anchor carrier carries information about non-anchor carriers supporting a multicast service.

3. The method according to claim 2, wherein, the information about the non-anchor carriers supporting the multicast service, comprises:

downlink operation frequency bins of the non-anchor carriers, uplink operation frequency bins of the non-anchor carriers, an index of the non-anchor carriers, a bitmap configuration of available downlink subframes, a downlink gap configuration, and information about in-band carriers.

4. The method according to claim 1, wherein, the network side broadcasts information about the non-anchor carriers supporting the multicast service on the anchor carrier.

5. The method according to claim 4, wherein, the information about the non-anchor carriers supporting the multicast service comprises:

downlink operation frequency bins of the non-anchor carriers, uplink operation frequency bins of the non-anchor carriers, an index of the non-anchor carriers, a bitmap configuration of available downlink subframes, a downlink gap configuration, and information about in-band carriers.

6. The method according to claim 1, wherein, the first information for receiving the multicast control channel of the anchor carrier comprises a repetition period, an offset, a first subframe, a duration and a updating period of the multicast control channel of the anchor carrier; and/or the second information for receiving the multicast control channel of the non-anchor carriers comprises: a repetition period, an offset, a first subframe, a duration and a updating period of the multicast control channel of the non-anchor carriers; and/or the third information for receiving the multicast control channel updating indication of the anchor carrier comprises: a repetition period, an offset, a first subframe, and a duration of the multicast control channel updating indication of the anchor carrier; and/or the fourth information for receiving the multicast control channel updating indication of the non-anchor carriers comprises: a repetition period, an offset, a first subframe, and a duration of the multicast control channel updating indication of the non-anchor carriers.

7. A method for receiving a multicast service, the method being applied in a terminal and comprising:

receiving information about the multicast service transmitted by a network side on carriers, wherein the carriers are an anchor carrier and/or non-anchor carriers;

selecting a target carrier from the carriers according to the information about the multicast service, and receiving the multicast service on the selected target carrier, wherein the target carrier is the anchor carrier and/or the non-anchor carrier, wherein, when the network side transmits, on the anchor carrier, fourth information for receiving a multicast control channel updating indication of the non-anchor carriers, the method further comprises:

receiving, by the terminal on the anchor carrier, the fourth information for receiving the multicast control channel updating indication of the non-anchor carriers; and receiving, on the non-anchor carriers according to the fourth information, a multicast control channel updating indication of the non-anchor carriers, and when the network side transmits a multicast control channel of the anchor carrier on the anchor carrier and transmits first information for receiving the multicast control channel of the anchor carrier, the receiving the information about the multicast service transmitted by the network side on the carriers, comprises:

receiving the first information for receiving the multicast control channel of the anchor carrier, the first information being transmitted by the network side on the anchor carrier; and receiving the multicast control channel of the anchor carrier on the anchor carrier according to the first information.

8. The method according to claim 7, wherein, the selecting a target carrier from the carriers according to the information about the multicast service, comprises:

receiving, by the terminal on the anchor carrier, information about the non-anchor carriers capable of supporting the multicast service; and selecting a carrier supporting the multicast service as the target carrier, by the terminal from the carriers according to the information about the multicast service and information about the non-anchor carriers supporting the multicast service.

9. The method according to claim 8, wherein, when the multicast control channel of the anchor carrier transmitted on the anchor carrier by the network side carries the information about the non-anchor carriers supporting the multicast service, the receiving, by the terminal on the anchor carrier, information about the non-anchor carriers supporting the multicast service, comprises:

selecting, by the terminal from the information about the multicast service transmitted on the carriers, the multicast control channel of the anchor carrier transmitted on the anchor carrier; and parsing the multicast control channel of the anchor carrier, and determining the information about the non-anchor carriers supporting the multicast service.

10. The method according to claim 8, wherein, when the network side broadcasts the information about the non-anchor carriers supporting the multicast service on the anchor carrier, the receiving, by the terminal on the anchor carrier, information about the non-anchor carriers supporting the multicast service, comprises:

receiving, by the terminal, a system message broadcast by the network side, and parsing the system message and determining the information about the non-anchor carriers supporting the multicast service.

11. The method according to claim 9, wherein, the information about the non-anchor carriers supporting the multicast service comprises:

downlink operation frequency bins of the non-anchor carriers, uplink operation frequency bins of the non-anchor carriers, an index of the non-anchor carriers, a bitmap configuration of available downlink subframes, a downlink gap configuration, and information about in-band carriers.

12. The method according to claim 7, wherein, when the network side transmits, on the anchor carrier, second information for receiving a multicast control channel of the non-anchor carriers, the receiving the information about the multicast service transmitted by the network side on the carriers, comprises:

receiving the second information for receiving the multicast control channel of the non-anchor carriers transmitted by the network side on the anchor carrier; and receiving, on the non-anchor carriers, the multicast control channel of the non-anchor carriers according to the second information.

13. The method according to claim 12, wherein, contents transmitted by the network side in the multicast control channel of the anchor carrier comprise: a Public Land Mobile Network Identifier of the multicast services supported by the network side, a Temporary Mobile Group Identifier (TMGI) of the multicast services supported by the network side, scheduling information about the multicast service channel of the non-anchor carriers transmitted on the non-anchor carriers; or the contents transmitted by the network side in the multicast control channel of the non-anchor carriers comprise: the Public Land Mobile Network Identifier of the multicast services supported by the network side, the TMGI of the multicast services supported by the network side, scheduling information about the multicast service channel of the non-anchor carriers transmitted on the non-anchor carriers.

14. The method according to claim 12, wherein, the first information for receiving the multicast control channel of the anchor carrier comprises:

a repetition period, an offset, a first subframe, a duration and a updating period of the multicast control channel of the anchor carrier; and/or the second information for receiving the multicast control channel of the non-anchor carriers comprises: a repetition period, an offset, a first subframe, a duration and a updating period of the multicast control channel of the non-anchor carriers.

15. The method according to claim 7, wherein when the network side transmits, on the anchor carrier, third information for receiving a multicast control channel updating indication of the anchor carrier, the method further comprises:

receiving, by the terminal on the anchor carrier, the third information for receiving the multicast control channel updating indication of the anchor carrier, and receiving the multicast control channel updating indication of the anchor carrier on the anchor carrier according to the third information.

16. The method according to claim 7, wherein, after receiving the multicast service on the selected target carrier, the method further comprises:

reporting, on the selected target carrier, the multicast service interested by the terminal.

17. An apparatus for transmitting a multicast service, the apparatus being applied to a network side and comprising:

a processor;

a storage connected to the processor through a bus interface; and a transceiver connected to the processor through the bus interface, wherein the storage is configured to store programs and data used by the processor when the processor performs operations, and the multicast service and the information about the multicast service is transmitted through the transceiver, and when the processor invokes and executes the programs and the data stored in the storage, the processor implements the method according to claim 1.

18. An apparatus for receiving a multicast service, the apparatus being applied to a terminal and comprising:

a processor;

a storage connected to the processor through a bus interface; and a transceiver connected to the processor through the bus interface, wherein the storage is configured to store programs and data used by the processor when the processor performs operations, and the multicast service and the information about the multicast service is received through the transceiver, and when the processor invokes and executes the programs and the data stored in the storage, the processor implements the method according to claim 7.

* * * * *